US012621884B2

(12) United States Patent
Kwon et al.

(10) Patent No.: US 12,621,884 B2
(45) Date of Patent: May 5, 2026

(54) METHOD AND APPARATUS FOR CONTROLLING PLURALITY OF DEVICES

(71) Applicant: SAMSUNG ELECTRONICS CO., LTD., Suwon-si (KR)

(72) Inventors: Jongchan Kwon, Suwon-si (KR); Jeongmin Kim, Suwon-si (KR); Jihoon Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 565 days.

(21) Appl. No.: 18/109,696

(22) Filed: Feb. 14, 2023

(65) Prior Publication Data

US 2023/0199878 A1    Jun. 22, 2023

Related U.S. Application Data

(63) Continuation of application No. PCT/KR2022/013243, filed on Sep. 5, 2022.

(30) Foreign Application Priority Data

Sep. 27, 2021    (KR) ........................ 10-2021-0127142

(51) Int. Cl.
*H04W 76/14*        (2018.01)
*H04W 72/56*        (2023.01)
*H04W 76/15*        (2018.01)

(52) U.S. Cl.
CPC ........... *H04W 76/14* (2018.02); *H04W 72/56* (2023.01); *H04W 76/15* (2018.02)

(58) Field of Classification Search
CPC ..... H04W 76/14; H04W 76/15; H04W 72/56;

H04L 12/12; H04M 1/72412; H04M 1/72448; H04M 1/72451; H04M 1/72415; H04M 1/72436; H04M 1/72472; H04M 2201/34; H04M 2201/36
USPC ......................................................... 455/436
See application file for complete search history.

(56) References Cited

U.S. PATENT DOCUMENTS

| | | | |
|---|---|---|---|
| 8,510,730 B2 | 8/2013 | Bae et al. | |
| 10,020,957 B2 | 7/2018 | Kim et al. | |
| 10,073,599 B2 | 9/2018 | Khoury et al. | |
| 2007/0192462 A1 | 8/2007 | Bae et al. | |

(Continued)

FOREIGN PATENT DOCUMENTS

| | | | | |
|---|---|---|---|---|
| CN | 113311975 A | * | 8/2021 | ............. G06F 9/543 |
| EP | 3855302 A1 | | 7/2021 | |

(Continued)

OTHER PUBLICATIONS

Extended European Search Report Issued In EP Application No. 22873129.5-1215, Mail Date Sep. 25, 2024, 8 Pages.

*Primary Examiner* — Hirdepal Singh
(74) *Attorney, Agent, or Firm* — CANTOR COLBURN LLP

(57)    ABSTRACT

An electronic device transmits a target mode entry notification of the electronic device to a target device, so that each of the target device and the electronic device may execute an application corresponding to the target mode. Also, the electronic device transmits a target mode release notification of the electronic device to the target device, so that each of the target device and electronic device may resume an application in execution before entering the target mode.

20 Claims, 15 Drawing Sheets

(56)                    References Cited

U.S. PATENT DOCUMENTS

| | | | |
|---|---|---|---|
| 2014/0049696 | A1 | 2/2014 | Sirpal et al. |
| 2016/0196048 | A1 | 7/2016 | Khoury et al. |
| 2016/0381553 | A1 | 12/2016 | Lee et al. |
| 2017/0250835 | A1 | 8/2017 | Kim et al. |
| 2019/0069149 | A1 | 2/2019 | Park et al. |
| 2020/0333994 | A1 | 10/2020 | Sepulveda et al. |
| 2020/0382336 | A1 | 12/2020 | Xie |
| 2021/0007018 | A1 | 1/2021 | Gan |
| 2021/0204349 | A1* | 7/2021 | Jin .................... H04W 28/0268 |
| 2023/0262605 | A1* | 8/2023 | Freeman ................. G10L 15/22 |
| | | | 455/563 |
| 2024/0040343 | A1* | 2/2024 | Lin ...................... G04G 9/0064 |

FOREIGN PATENT DOCUMENTS

| | | | | |
|---|---|---|---|---|
| JP | 2016085710 | A | 5/2016 | |
| KR | 20080059953 | A | 7/2008 | |
| KR | 101306700 | B1 | 9/2013 | |
| KR | 20150026109 | A | 3/2015 | |
| KR | 101639938 | B1 | 7/2016 | |
| KR | 101781859 | B1 | 9/2017 | |
| WO | WO-2021109959 | A1 * | 6/2021 | ............. G06F 9/542 |

* cited by examiner

FIG. 6B

| Status (mode) | Example for each type of occupation | Candidate device | Candidate application | | | | |
|---|---|---|---|---|---|---|---|
| | | | 1 | 2 | 3 | 4 | 5 |
| Target mode | Designer | Smartphone | Slack | Miro | Telegram | Workspace | WhatsApp |
| | | PC | Sketch | Adobe photoshop | Illustrator | Inkscape | Axure |
| | | Tablet | Autodesk sketchbook | Adobe photoshop sketch | Sketchup | Pencil Sketch | Photo To Sketch |
| | | Smart TV | Zoom | Teams | Skype | Google Meet | Team viewer |
| | | Wearable(Samrt Watch) | Just press record | Schedule alarm | Productive | Streaks | Clicker |
| | Strategy/analysis | Smartphone | Slack | Telegram | Miro | WhatsApp | Workspace |
| | | PC | Miro | Presentation | Gmail | Excel | One drive |
| | | Tablet | Acrobat reader | Google Doc | Calendar | Simple note | Evernote |
| | | Smart TV | Zoom | Teams | Skype | Google Meet | Team viewer |
| | | Wearable(Samrt Watch) | Just press record | Schedule alarm | Productive | Streaks | Clicker |
| | S/W engineer | Smartphone | Slack | Discord | Telegram | WhatsApp | Miro |
| | | PC | Coding program | Android studio | lunacy | Workspace | Visual studio |
| | | Table | Triangle Utility | Quick3DPlan | Sync.Me | Dropbox | Drafts |
| | | Smart TV | Zoom | Teams | Skype | Google Meet | Team viewer |
| | | Wearable(Samrt Watch) | PCALC | Just press record | Productive | Streaks | Clicker |
| | Marketing | Smartphone | Telegram | Slack | Google Ad. | WhatsApp | Workspace |
| | | PC | Miro | Google Analysis | Presentation | Excel | Gmail |
| | | Table | Evernote | ToDoist | Calendars 5 | Due | Acrobat reader |
| | | Smart TV | Zoom | Teams | Skype | Google Meet | Team viewer |
| | | Wearable(Samrt Watch) | Just press record | Schedule alarm | Productive | Streaks | Clicker |

FIG. 13

METHOD AND APPARATUS FOR CONTROLLING PLURALITY OF DEVICES

CROSS-REFERENCE TO RELATED APPLICATIONS

This application is a continuation application, claiming priority under § 365(c), of International Application No. PCT/KR2022/013243, filed on Sep. 5, 2022, which is based on and claims the benefit of Korean patent application number 10-2021-0127142, filed on Sep. 27, 2021, in the Korean Intellectual Property Office, the disclosures of which are incorporated by reference herein in their entireties.

BACKGROUND

1. Field

Various example embodiments of the disclosure relate to a method and apparatus for controlling a plurality of devices and, more particularly, to a method and apparatus for allowing a plurality of devices to collectively enter a target mode or for collectively releasing the target mode.

2. Description of Related Art

With the development of wireless communication, multiple electrical and electronic products used at home are connected to a single network device that facilitates two-way communication in a wired and/or wireless manner. Further, with the advent of smartphones, a smart home service capable of controlling devices used at home using the smartphone is becoming common. As the use of the smartphone is diversified, the smart home service is used in various aspects more frequently. Therefore, improvement plans for more efficiently operating the smart home service are being studied.

SUMMARY

Typically, for a smart home service to operate per a user's desire, each of a plurality of devices that play a role in the service needs to execute an application for the service to be performed. For example, when the user performs a job, each of the plurality of devices needs to execute the application suitable for the job; however, it is cumbersome for the user to individually execute an application for each of the plurality of devices. As another example, when the user finishes a job and performs some exercise, it is also cumbersome to individually change to an application suitable for exercise for each of the plurality of devices.

According to various example embodiments, in response to an electronic device entering a target mode, a first target device is caused to enter the target mode by transmitting a target mode entry notification to the first target device. Also, in response to releasing the target mode, the electronic device may release the target mode of the first target device by transmitting a target mode release notification to the first target device.

In response to entering the target mode, the electronic device, according to an example embodiment, may pause execution of a first application before entering the target mode and may execute a second preset application in response to the target mode. In the case of releasing the target mode, the electronic device may resume the paused application (paused before entering the target mode). Likewise, in response to entering the target mode, each first target device corresponding to the target mode may pause executing an application before entering the target mode and may execute a preset application in response to the target mode, or in response to the request to enter the target mode. In the case of releasing the target mode, each first target device may resume the execution of the application that was paused before entering the target mode.

A method performed by an electronic device according to an example embodiment may include setting an application to be executed when an electronic device enters a target mode with respect to one or more target devices. The target devices are selected from among several external devices of the same user (who is using the electronic device). In response to the electronic device entering the target mode, an application corresponding to the target mode is executed on the electronic device. The electronic device transmits to the at least one target device a target mode entry notification of the electronic device. The notification triggers an operation of executing the application corresponding to the target mode in the target device(s). Further, in response to the electronic device releasing the target mode, the execution of the application that was paused before entering the target mode is resumed. Further, the electronic device transmits, to the at least one target device, a target mode release notification that triggers an operation of resuming execution of the application that was paused before entering the target mode on the target device(s).

An electronic device, according to an example embodiment, may include a processor configured to set an application to be executed when the electronic device enters a target mode. The target mode corresponds to one or more target devices selected from among external devices of the same user that is using the electronic device. In response to entering the target mode, an application corresponding to the target mode is executed. Further, a target mode entry notification of the electronic device is transmitted to at least one of the target devices. The notification triggers an operation of executing the application corresponding to the target mode in the target device. In response to releasing the target mode, the paused application is resumed on the electronic device. Further, a target mode release notification of the electronic device is transmitted to the at least one of the target devices. The release notification triggers an operation of resuming the paused application on the target device(s).

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6B illustrates a process of entering, by an electronic device, a target mode or releasing the target mode based on a preset schedule of the target mode according to an example embodiment;

FIG. 13 is an example table showing information on a candidate device corresponding to a target mode and a candidate application to be executed in response to entering the target mode, received by an electronic device from a server according to an example embodiment.

DETAILED DESCRIPTION

Figure 1:
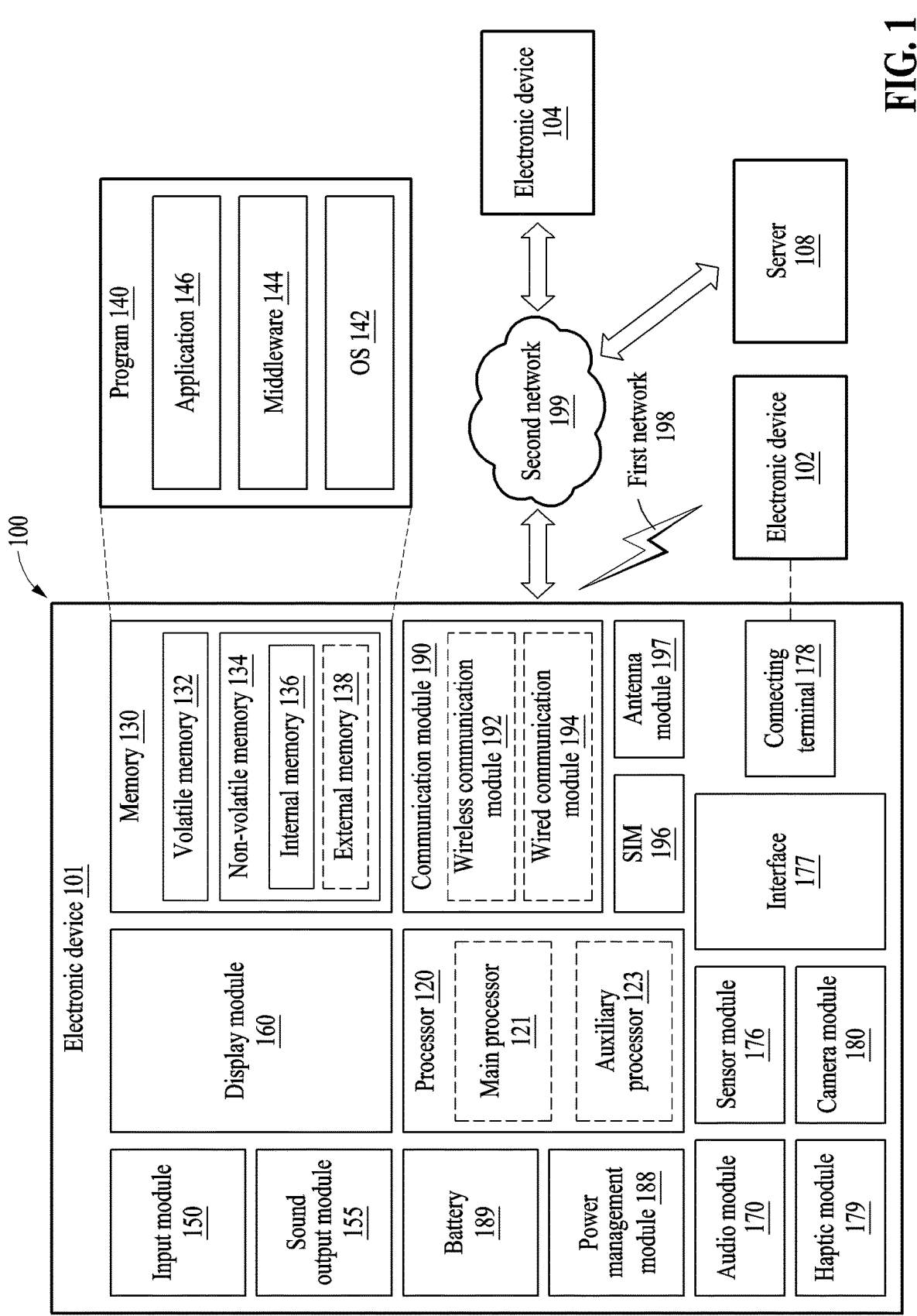
FIG. 1 is a block diagram illustrating an example electronic device in a network environment according to various example embodiments.

Hereinafter, various example embodiments will be described in greater detail with reference to the accompanying drawings. When describing the example embodiments with reference to the accompanying drawings, like reference numerals refer to like elements, and a repeated description related thereto will be omitted.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all, or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and can include various changes, equivalents, or replacements for a corresponding example embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138)

that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively, or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
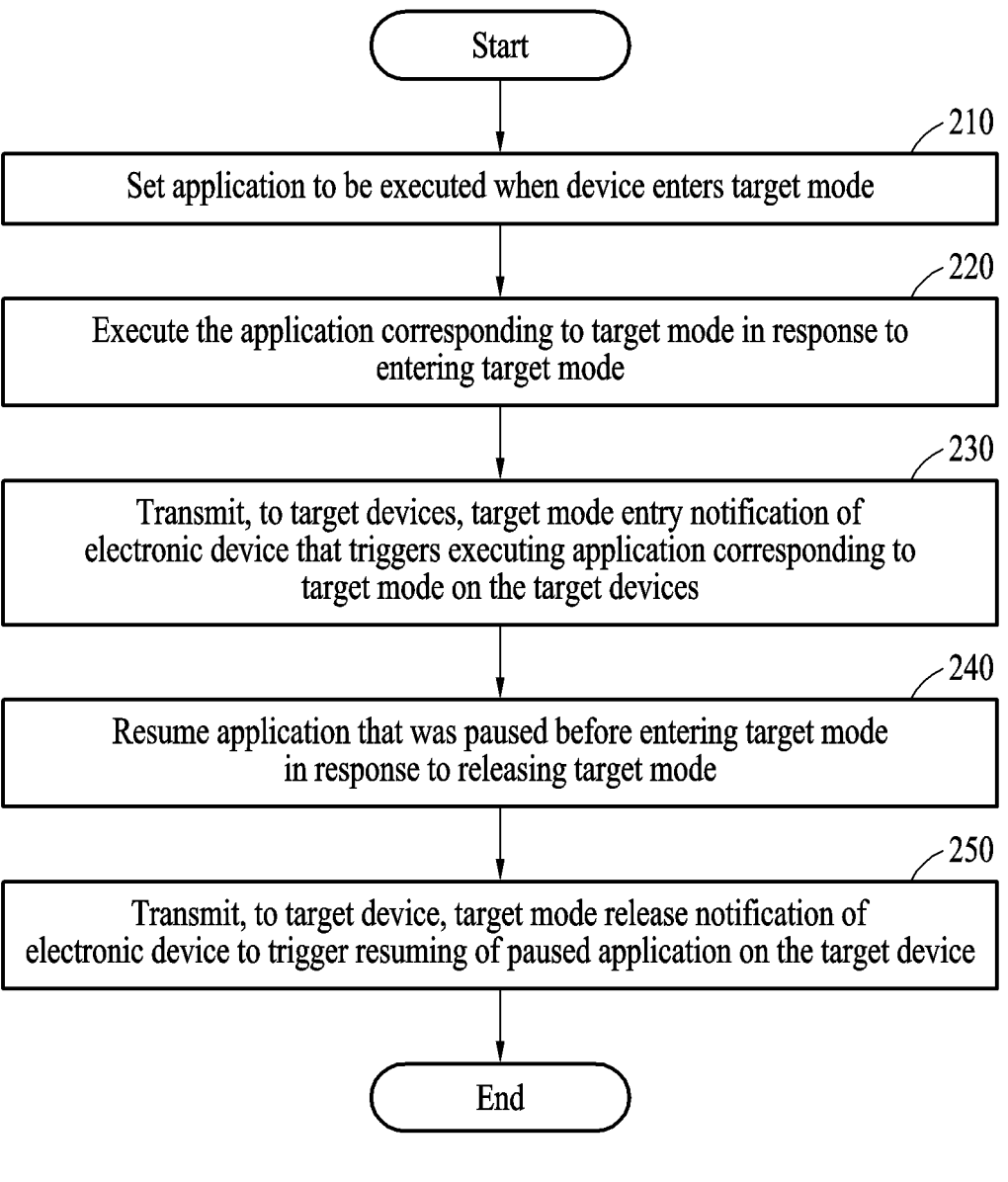
FIG. 2 is a flowchart illustrating an operation of an electronic device according to an example embodiment.

FIG. 2 is a flowchart illustrating an operation of an electronic device according to an example embodiment.

In operation 210, an electronic device (e.g., the electronic device 101 of FIG. 1) may set an application to be executed when the electronic device enters a target mode with respect to one or more target devices. The target devices may be selected from among external devices that are used by the same user who is using the electronic device. Alternatively, or in addition, the target devices may be selected from several external devices that are registered to the same user. The external devices are also electronic devices of one or the other type. When the electronic device enters the target mode, the target devices selected may collectively enter the target mode. Here, the application may be a computer program that is already installed on the electronic device.

Alternatively, or in addition, the application may be installed on the electronic device upon selection. In some embodiments, the application that is selected is installed on the target devices upon selection by the electronic device.

In operation 220, in response to entering the target mode, the electronic device may execute the selected application corresponding to the target mode. When the electronic device enters the target mode, the electronic device may provide efficient user experience (UX) to the user of the electronic device by automatically executing the application corresponding to the target mode. According to an example embodiment, in response to entering the target mode, the electronic device may pause an (first) application (distinct from the selected application) that may be in execution before entering the target mode. According to another example embodiment, in response to entering the target mode, the electronic device may continue to execute the (first) application (distinct from the selected application) that may be in execution from before entering the target mode. In some embodiments, such first application may be executed as a background application.

In operation 230, the electronic device may transmit to the one or more target devices, a target mode entry notification of the electronic device. In some embodiments, the entry notification triggers an operation of executing the application corresponding to the target mode in the one or more target devices. The electronic device transmits the target mode entry notification to the target devices to cause the target devices (that are selected) to collectively enter the target mode in conjunction with the electronic device. Each of the target devices may enter the target mode in response to receiving the target mode entry notification from the electronic device. Each electronic device may enter the target mode in a respective manner.

In operation 240, in response to releasing the target mode, the electronic device may resume the (first) application that may have been paused before entering the target mode.

In operation 250, the electronic device may transmit to the target devices, a target mode release notification of the electronic device. In some embodiments, the release notification triggers an operation of resuming a paused application (for example, paused before entering the target mode). Each of the target devices may release the target mode in response to receiving the target mode release notification from the electronic device. Once the target mode is released, a target device may resume the application that was executing (and was paused) before entering the target mode.

Figure 3:
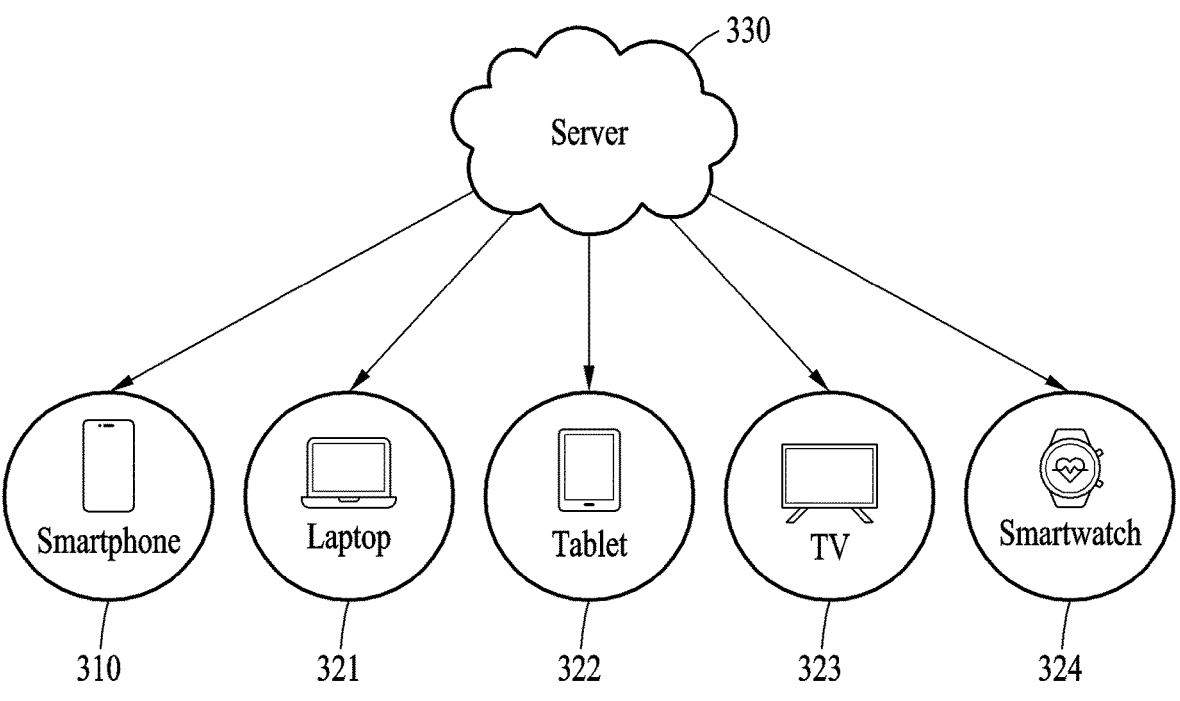
FIG. 3 illustrates a process of selecting, by an electronic device, at least one first target device in response to a target mode according to an example embodiment.

FIG. 3 illustrates a process of selecting, by an electronic device, a target device according to an example embodiment.

An electronic device 310 may select at least one target device from among external devices of the same user as the electronic device 310. In the following, the electronic device 310 is described as a mobile terminal (e.g., a portable communication device). However, without being limited thereto, the electronic device 310 may be another electronic device, such as, a tablet, a laptop, a television (TV), a smartwatch, or the like.

The electronic device 310 may identify external devices 321, 322, 323, and 324 of the same user. According to an example embodiment, the electronic device 310 may establish communication with a server 330. The electronic device 310 may be connected to the server 330 with a user account of the user of the electronic device 310. The server 330 may verify the connected user account for each of external devices connected to the server 330. The server 330 may search for the external devices 321, 322, 323, and 324 connected with the user account of the same user as the user of the electronic device 310. The server 330 may transmit information on the found external devices 321, 322, 323, and 324 to the electronic device 310. The electronic device 310 may identify the external devices 321, 322, 323, and 324 of the same user through the server 330 and may select at least one of the target devices from among the identified external devices 321, 322, 323, and 324.

According to an example embodiment, the electronic device 310 may search for other external devices that use the same Wi-Fi access point as that of the electronic device 310. The electronic device 310 may identify the external devices 321, 322, 323, and 324 connected to the same Wi-Fi access point as that of the electronic device 310 as external devices of the same user as the user of the electronic device 310.

Figure 4:
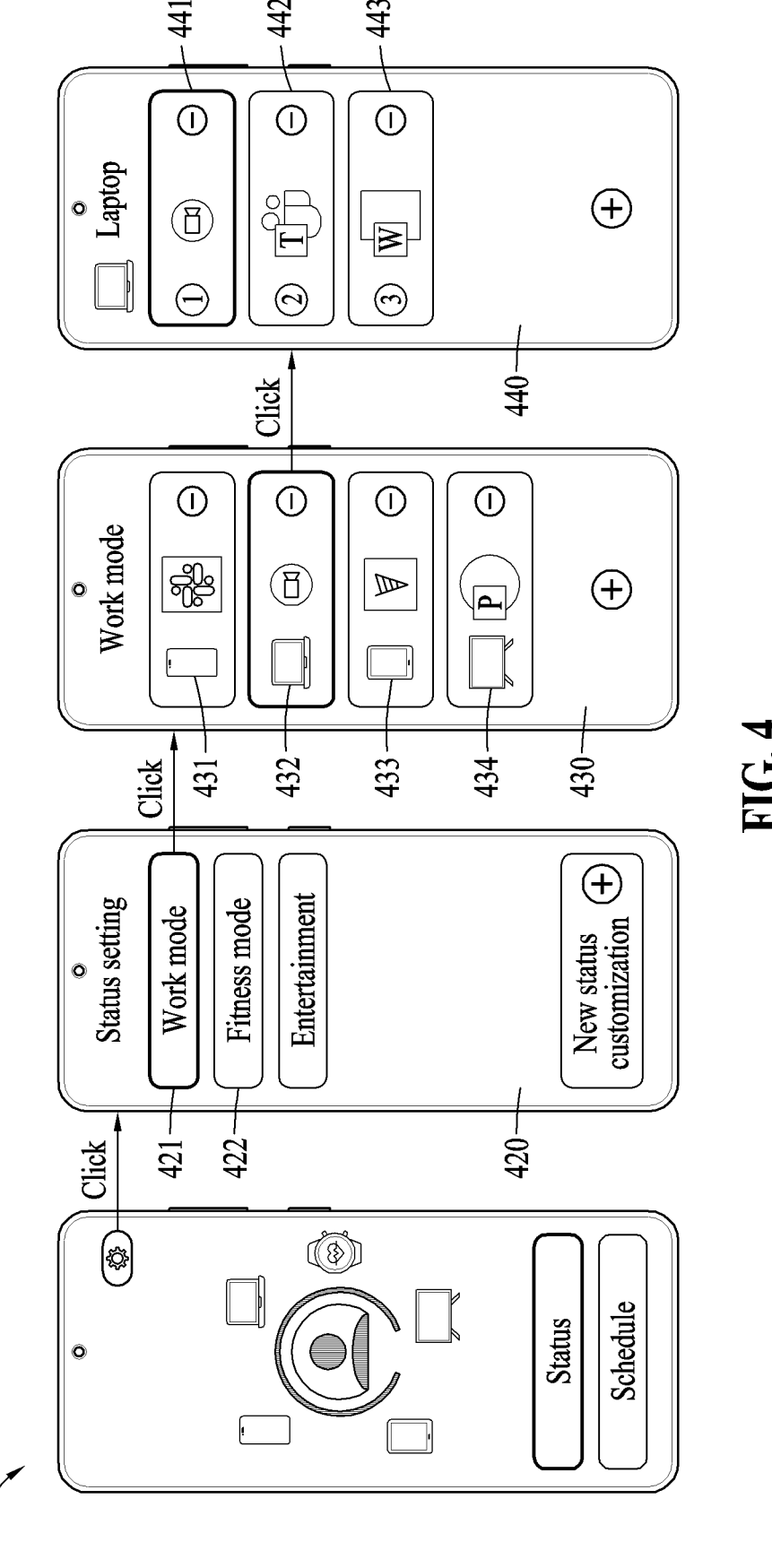
FIG. 4 illustrates a process of setting, by an electronic device, a first target device corresponding to a target mode and an application to be executed according to an example embodiment.

FIG. 4 illustrates a process of setting, by an electronic device, a target device corresponding to a target mode and an application to be executed according to an example embodiment.

An electronic device 400, according to an example embodiment, may select a target device for each of a plurality of modes allowing entry of the electronic device 400 and may set an application to be executed when each of the selected target device and the electronic device 400 may enter a corresponding mode.

A screen 420 refers to a screen for inputting a setting for a mode from among the plurality of modes that the electronic device 400 may enter. For example, the electronic device 400 may enter a mode such as Work mode 421, Fitness mode 422, Entertainment mode 423, etc. It can be appreciated that the modes the electronic device 400 may enter are not limited thereto. Further, in one or more embodiments, the user may add/edit one or more modes that the electronic device 400 may enter.

The electronic device 400 may select a target device from among external devices of the same user in response to entering the target mode. For example, consider that the target mode is the Work mode 421. A screen 430 refers to a screen for selecting target devices corresponding to the Work mode 421 from among the external devices of the same user. When the electronic device 400 enters the Work mode 421, the electronic device 400 may select the first target device to collectively enter the Work mode 421 with the electronic device 400 from among the external devices of the user. For example, the electronic device 400 may select a laptop 432, a tablet 433, and a TV 434 as the target devices to enter the Work mode 421 in conjunction with the electronic device 400.

The electronic device 400 may set at least one application to be executed when a corresponding device enters the target mode. In some embodiments, each target device can be set with a respective application to be executed in the target mode. In some embodiments, a target device can be set with more than one application to be executed when entering the target mode. The electronic device 400 may transmit information on the one or more applications set for a target device corresponding to the target mode. In the case of entering the target mode, the target device executes the one or more applications as set by the electronic device 400.

In some embodiments, the electronic device 400 may set execution priority of the one or more applications set for the electronic device 400 and each of the target devices. According to an example embodiment, when a target device enters the target mode, the target device may execute a first application with relatively higher execution priority from among the one or more applications set and, if/when the first application is terminated or if/when the first application is not supported, the target device may execute a second application with subsequent execution priority from the one or more applications.

Consider an example scenario when the laptop 432 is a target device selected corresponding to the Work mode 421 as the target mode. A screen 440 refers to a screen for setting the one or more applications scheduled to be executed when the laptop 432 enters the Work mode 421. For example, when the laptop 432 enters the Work mode 421, in response to the electronic device 400 entering the Work mode 421, the laptop 432 may be set to execute a first application 441, a second application 442, and a third application 443. Further, the electronic device 400 may set execution priority as shown—in order of the first application 441, the second application 442, and the third application 443. The electronic device 400 transmits, to the laptop 432, the instructions for the setup so that when the laptop 432 enters the Work mode 421, laptop 432 executes the applications (e.g., the first application 441, the second application 442, and the third application 443) per the instructions. Accordingly, upon receiving a target mode entry notification from the electronic device 400 (i.e., Work mode 421), the laptop 432 may sequentially execute the first application 441, the second application 442, and the third application 443. It is understood that the number of applications to be executed can be different in other embodiments. Further, it is understood that the order of execution of the applications can be different in other embodiments. Additionally, it is understood that any other device/target mode combination can be used and setup in this manner, and that the laptop/work mode combination is just one possible example.

Figure 5:
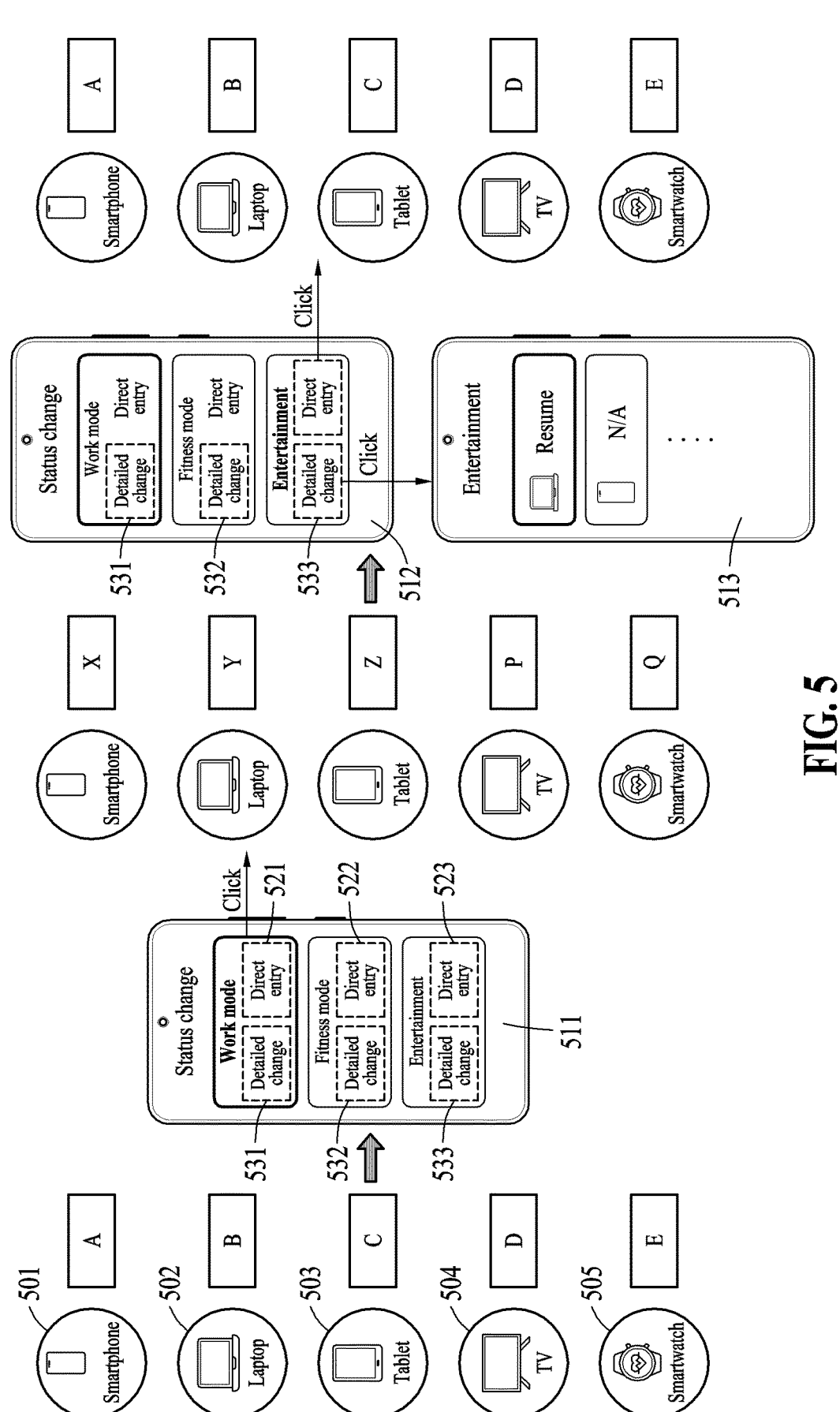
FIG. 5 illustrates a process of entering, by an electronic device, a target mode or releasing the target mode by receiving an input for selecting an interface from a user according to an example embodiment.

FIG. 5 illustrates a process of entering, by an electronic device, a target mode or releasing the target mode by receiving an input from a user via a user interface according to an example embodiment.

Screens 511 and 512 refer to screens on which first interfaces 521, 522, and 523 and second interfaces 531, 532, and 533, respectively, corresponding to a plurality of modes allowing entry of an electronic device 501 are displayed. Initially, the electronic device 501 may display the screen 511 for displaying the plurality of first interfaces 521, 522, and 523 corresponding to the plurality of modes the electronic device 501 may enter. The screen 511 is displayed on a display of the electronic device 501.

In the case of receiving an input from the user via the interface (screen 511) to select a target mode, the electronic device 501 initiates entry into the selected the target mode. The user can select from any of the available target modes by selecting the corresponding first interface. In the depicted case, the first interfaces 521, 522, and 523 are respectively corresponding to the Work mode 421, Fitness mode 422, and Entertainment mode 423. As noted elsewhere, the electronic device 501 can provide additional/different target modes, and will have additional/different first interfaces accordingly. Upon receiving the selection of the target mode (e.g., Work mode 421), the electronic device 501 may execute the one or more applications corresponding to the target mode and may pause any ongoing application(s) that may be in execution before entering the target mode.

Now, an example in which the target mode is Work mode 421 is described. For example, when the electronic device 501 receives an input selecting the first interface 521 corresponding to the Work mode from the user, the electronic device 501 enters the Work mode. The electronic device 501 may be executing an application A before receiving the selection to enter the 'Work mode 421.' The electronic device 501 may pause the application A. Subsequently, the electronic device 501 may execute an application B that is set to execute in response to the Work mode. Further, as part of entering the Work mode, the electronic device 501 transmits a Work mode entry notification Work mode to the one or more target devices. Consider that the target devices 502, 503, 504, 505 have been selected corresponding to the Work mode 421 as described elsewhere herein. Upon receiving the Work mode entry notification from the electronic device 501, the target devices 502, 503, 504, and 505 may responsively enter the Work mode. Entering the Work mode, by a target device, may include pausing (e.g., interrupting) an application that is in an ongoing execution since before the request to enter the Work mode. The target device may execute the one or more applications that are set to be executed in the Work mode. For example, consider that the first target device 504 (e.g., a TV) is executing an application D when the request for entering the Work mode is received from the electronic device 501. The first target device 504, in response to the request for entering the Work mode, may pause execution of the application D and may execute an application P, which is set for execution in the Work mode (as described elsewhere herein).

According to an example embodiment, consider that another input is received via the first interface that selects a mode different from the target mode. For example, the electronic device 501 is in the Work mode 421, and the user now selects the Fitness mode 422 as the new target mode. The electronic device 501 releases the existing mode (in this case, Work mode) and enters the new target mode (i.e., Fitness mode). As part of releasing the target mode, the electronic device 501 may resume an application that was in execution before entering the target mode, and which was paused as part of entering the target mode. Also, the electronic device 501 may execute an application corresponding to entering the new target mode. In some embodiments, if the electronic device 501 was operating in the new target mode before entering the target mode, the electronic device 501 may simply resume the application that was paused prior to entering the target mode. However, if the electronic device 501 was operating in a third mode different from the new target mode before entering the target mode, the electronic device 501 may execute the application corresponding to the new target mode without resuming the application that was paused prior to entering the target mode.

For example, consider that the electronic device 501 is operating in a first mode, Work mode, and receives instruction/selection to change into Entertainment mode as the target mode. Upon receiving such input via the first interface 523, the electronic device 501 releases the Work mode and enters Entertainment mode. If the electronic device 501 was operating in Entertainment mode before entering the Work mode, the electronic device 501 may resume an application A that was in execution before entering the Work mode, and which was paused prior to entering the Work mode.

In some embodiments, the electronic device 501 may display the screen 511, 512 including the plurality of second interfaces 531, 532, and 533 respectively corresponding to the plurality of modes the electronic device 501 may enter. Upon receiving an input for selecting the second interface 533 corresponding to the first mode (e.g., Entertainment mode) from the user through the screen 512, the electronic device 501 may display a screen 513 capable of changing a setting of the first mode. Here, setting a mode may represent a setting of a target device corresponding to the mode and a setting of an application to be executed for both, the electronic device 501 and the target device, in response to entering the corresponding mode. For example, in response to an input from the user, through the screen 513, the electronic device 501 may change a target device corresponding to Entertainment mode that is to collectively enter Entertainment mode with the electronic device 501 and may also cause one or more selected applications to be executed on each of the electronic device 501 and the target device.

Further, upon entering the target mode, the electronic device 501, according to an example embodiment, may execute at least one function corresponding to the target mode in addition to executing the application corresponding to the target mode. For example, the at least one function may include a function for brightness of the display, a function for volume, a function for wireless Internet connection, a function for short-range communication, and any other such function that changes one or more settings of the electronic device 501. According to an example embodiment, the electronic device 501 may set at least one function to be executed in addition to an application to be executed in response to entering the target mode requested by the user. Upon entering the target mode, the electronic device 501 may execute at least one function set corresponding to the target mode. Also, in the case of releasing the target mode, the electronic device 501 may revert changes made by the function that was executed in response to the target mode. Accordingly, the settings of the electronic device are changed back to values that were before entering the target mode.

For example, consider that the electronic device 501 sets a brightness of the display to a first brightness value and sets volume of the electronic device 501 to a first volume value in response to entering the target mode. In this case, upon entering the target mode, the electronic device 501 changes configuration/settings to set the brightness of the display to the first brightness value and set the volume of the electronic device 501 to the first volume value. At the time of releasing the target mode, the electronic device 501 may change the brightness of the display and the volume of the electronic device 501 to the original values before entering the target mode. The original values are stored before entering the target mode.

Also, in addition to the electronic device 501, each of the first target devices 502, 503, 504, and 505 selected in response to the target mode may execute at least one function that is set to execute in response to entering the target mode. For example, the electronic device 501 may set at least one function to be executed for each of the target devices 502, 503, 504, and 505 when that target device enters the target mode, with respect to each of the first. Further, upon releasing the target mode, each of the target devices 502, 503, 504, and 505 reverts values set by the at least one function that was executed in response to entering the target mode. Accordingly, the target devices revert to values before entering the target mode.

Figure 6A:
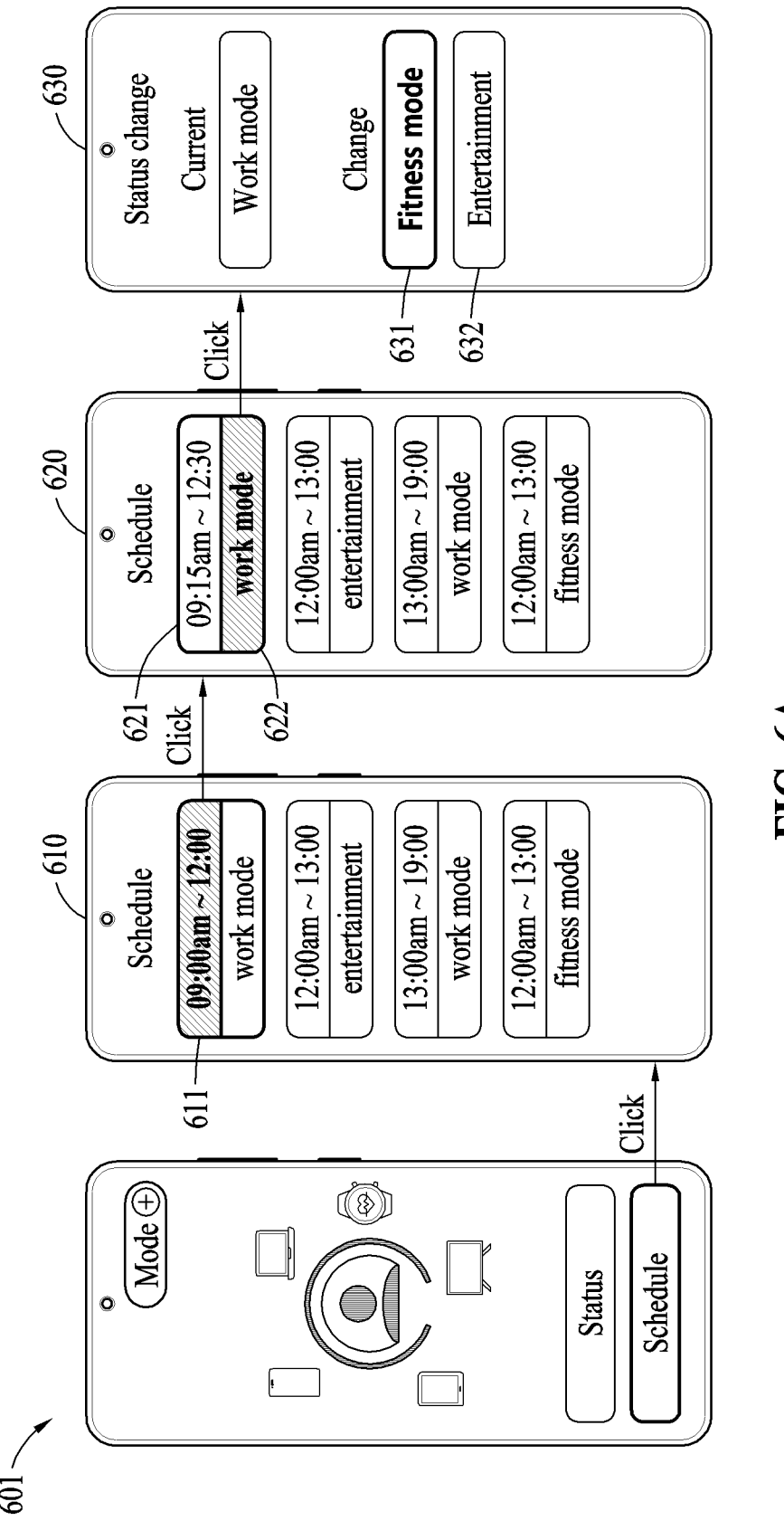
FIG. 6A illustrates a process of setting, by an electronic device, a schedule for a target mode according to an example embodiment.

FIG. 6A illustrates a process of setting, by an electronic device, a schedule for a target mode according to an example embodiment.

As described above with reference to FIG. 5, in response to receiving an input from a user via selection of a first interface corresponding to a target mode, an electronic device 601 enters the target mode. In addition, the electronic device 601 may enter the target mode by setting a schedule related to the target mode. The electronic device 601 may enter the target mode based on the preset schedule of the target mode and generate and display a mode change message.

According to an example embodiment, the electronic device 601 may set a schedule of the target mode to specify a scheduled entry timepoint for entry into the target mode. The schedule may also specify a scheduled release timepoint at which the electronic device releases the target mode. For example, consider that the target mode is Work mode. The electronic device 601 may preset the schedule of the target mode such that the scheduled entry timepoint of the Work mode is 9:00 am and the scheduled release timepoint of the Work mode is 12:00 am.

The electronic device 601 may correct the preset schedule of the target mode. Referring to a screen 610 of FIG. 6A, the electronic device 601 may correct a time section from the scheduled entry timepoint to the scheduled release timepoint that is mapped to the Work mode. Referring to a screen 620, the electronic device 601 may change a preset time section 611 from 9:00 am to 12:00 pm to a time section 621 from 9:15 am to 12:30 pm. Also, the electronic device 601 may also change a mode that is mapped to the time section 621. Referring to a screen 630, the electronic device 601 may change Work mode 622 mapped to the time section 621 to Fitness mode 631 or Entertainment mode 632. For example, when the electronic device 601 changes a mode mapped to the time section 621 to the Fitness mode 631, a schedule of the Fitness mode 631 may be set such that a scheduled entry point in time for the Fitness mode 631 is 9:15 am and a scheduled release point in time for Fitness mode is 12:30 pm. It is understood that the timepoints provided herein are exemplary, and in one or more embodiments, other timepoints can be used.

Figure 6B:
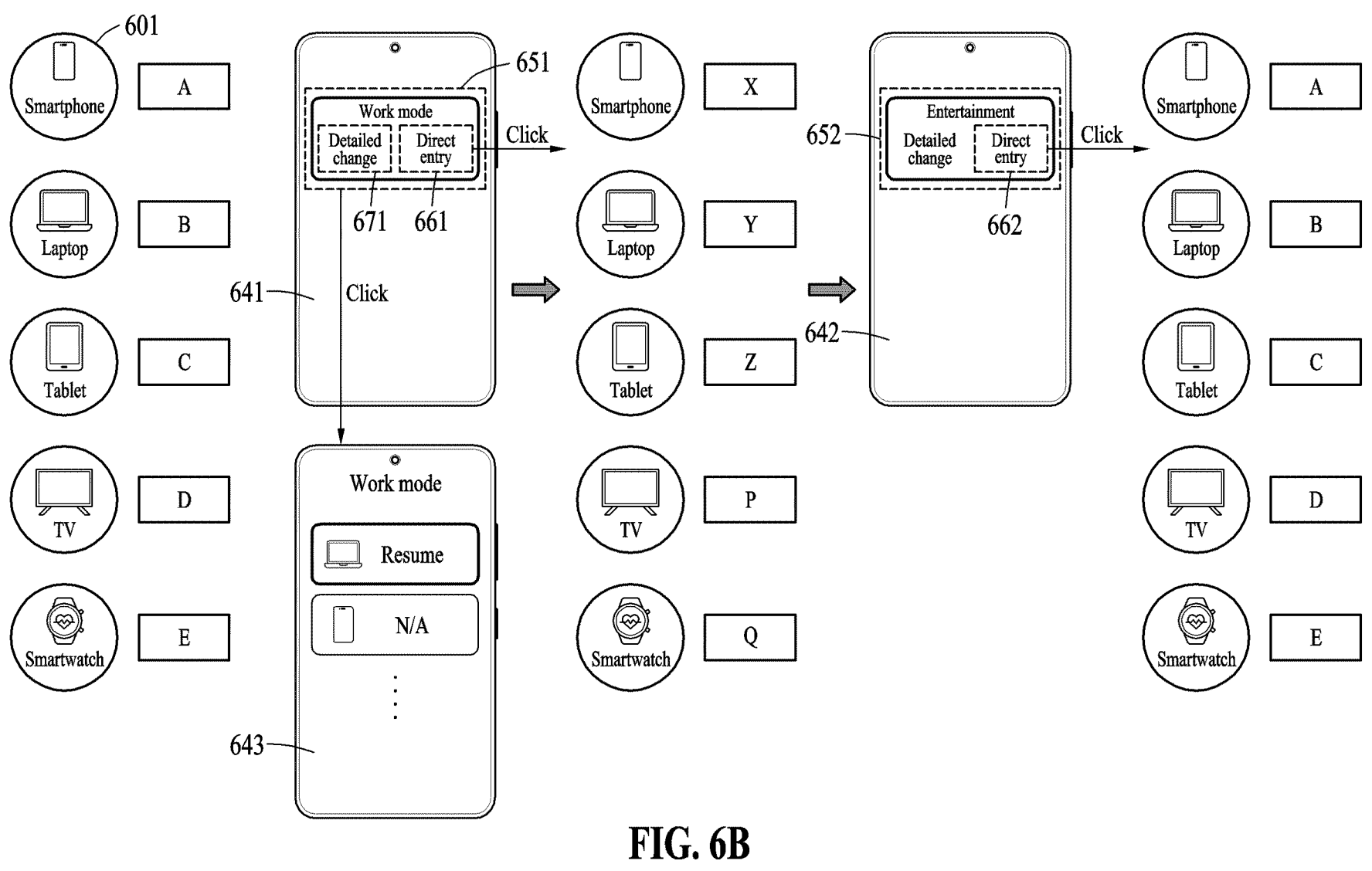

FIG. 6B illustrates a process of entering, by an electronic device, a target mode or releasing the target mode based on a preset schedule of the target mode according to an example embodiment.

According to an example embodiment, at the scheduled entry timepoint for the target mode, the electronic device 601 may generate and display a mode entry message. The mode entry message may provide information to the user that the scheduled entry timepoint for the target mode has occurred. The message 651 accordingly serves as a reminder to the user in one or more embodiments.

For example, consider that the target mode is Work mode and Work mode that a scheduled entry timepoint for Work mode is 9:00 am and a scheduled release timepoint Work mode is 12:00 μm. In this case, at 9:00 am Work mode, a mode entry message 651 corresponding to the Work mode may be generated. Further, at the scheduled entry timepoint Work mode, the electronic device 601 may display a screen 641 with the mode entry message 651.

According to an example embodiment, in the case of receiving an input of selecting the mode entry message 651 from the user, the electronic device 601 may enter the target mode.

In some embodiments, the mode entry message 651 may include a third interface 661 and a fourth interface 671. Here, the third interface 661 provides the same functionality as the first interface of FIG. 5 and, upon receiving an input of selecting the first interface or the third interface 661 from the user, the electronic device 601 may immediately enter a mode corresponding to the corresponding interface. The fourth interface 671 provides the same functionality as the second interface of FIG. 5 and, in the case of receiving an input of selecting the second interface or the fourth interface 671 from the user, the electronic device 601 may display a screen capable of changing a setting for a mode corresponding to an interface on the display.

For example, referring to the screen 641, upon receiving an input selecting the third interface 661 included in the mode entry message 651 from the user, the electronic device 601 may enter the Work mode. The electronic device 601 enters the Work mode as described herein (e.g., see FIG. 5). The electronic device 601 may pause an application in execution before entering the Work mode and may execute an application set in response to the Work mode. Further, when the electronic device 601 receives an input of selecting the fourth interface 671 included in first notification information 651 from the user, the electronic device 601 may display a screen 643 capable of changing a setting of the Work mode on the display.

According to an example embodiment, at a scheduled release timepoint of the target mode, the electronic device 601 may generate and display a mode release message (not shown) corresponding to the target mode. For example, at 1:00 pm, i.e., scheduled release timepoint of the Work mode, the electronic device 601 may generate and display the mode release message (not shown) corresponding to the Work mode. Upon receiving an input of selecting a mode release message (not shown) from the user, the electronic device 601 may release the Work mode. When the Work mode is released, the electronic device 601 may resume an application that was in execution (and paused) before entering the Work mode.

As described herein, the electronic device 601 may release the target mode based on the mode release message corresponding to the target mode. According to another example embodiment, the electronic device 601 may release the target mode based on a mode entry message corresponding to a first mode different from the target mode. For example, consider that the scheduled release timepoint of the Work mode is identical to the scheduled entry timepoint of Entertainment mode. In this case, when the scheduled release timepoint of the Work mode arrives, the scheduled entry timepoint of Entertainment mode simultaneously arrives. Therefore, the electronic device 601 may not generate the mode release message corresponding to the Work mode but a mode entry message 652 corresponding to Entertainment mode. The electronic device 601 may display a screen 642 for displaying the mode entry message 652 corresponding to Entertainment mode on the display. Upon receiving an input of selecting the mode entry message 652 from the user, the electronic device 601 may release the Work mode and enter the Entertainment mode. In this case, the electronic device 601 may execute an application corresponding to Entertainment mode. The electronic device 601 further transmits a Work mode release notification to the one or more target devices selected for the Work mode. In addition, the electronic device 601 transmits an Entertainment mode entry notification to each target device selected for Entertainment mode. It should be noted that the set of target devices selected for the Work mode can be different from the set of target devices selected for the Entertainment.

Figure 7:
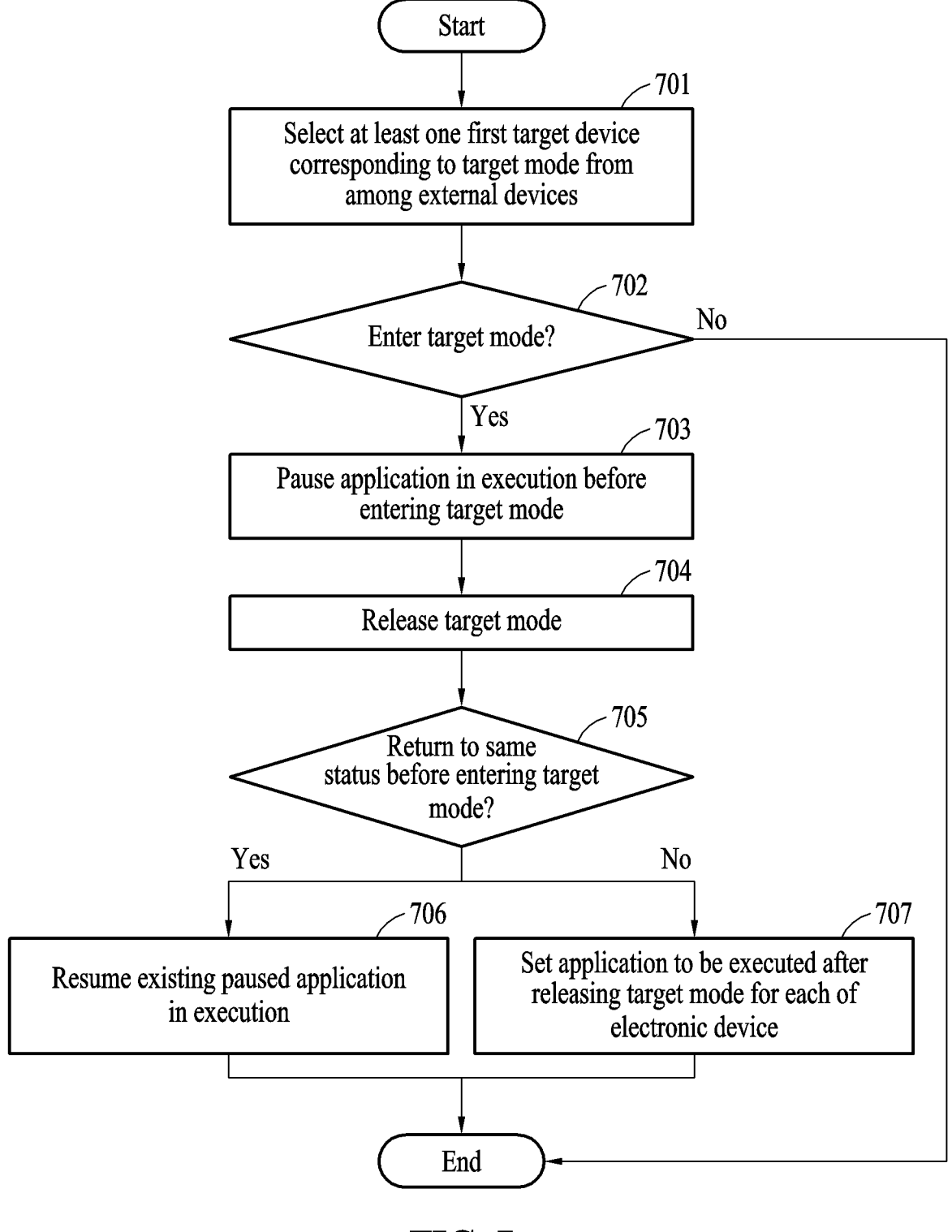
FIG. 7 is a flowchart illustrating a process of changing an entry mode of an electronic device according to an example embodiment.

FIG. 7 is a flowchart illustrating a process of changing an entry mode of an electronic device according to an example embodiment.

In operation 701, the electronic device may select at least one target device corresponding to a target mode from among external devices of the same user as a user of the electronic device. For example, the electronic device may receive, from a server (e.g., the server 330 of FIG. 3) information on external devices connected with a user account of the same user as the user of the electronic device. Alternatively, or in addition, the electronic device may receive, from the user, a selection of one or more target devices corresponding to the target mode from among the external devices. The electronic device may collectively enter the target mode with the selected target devices.

In operation 702, the electronic device may determine whether to enter the target mode. The electronic device may enter the target mode by receiving a user input based on selection via an interface (e.g., the first interface of FIG. 5 or the third interface of FIG. 6B) corresponding to the target mode. Alternatively, or in addition, the electronic device may enter the target mode based on a preset schedule.

In operation 703, in response to entering the target mode, the electronic device may store a job that is being performed on an application in execution before entering the target mode and pause the application that is in execution. Also, the electronic device may transmit a target mode entry notification to the target devices selected for the target mode. In the case of receiving the target mode entry notification from the electronic device, each of the selected target devices enters the target mode too. A target device from the selected target devices stores a job that is being performed on an application in execution before entering the target mode and may pause the application that is in execution on the target device.

In operation 704, the electronic device may release the target mode. According to an example embodiment, the electronic device may release the target mode upon receiving a user input based on selection of an interface (e.g., the first interface of FIG. 5 or the third interface of FIG. 6B) corresponding to a mode different from the target mode. Alternatively, or in addition, the electronic device may release the target mode based on the preset schedule.

In operation 705, the electronic device may determine whether to return to the same status as before entering the target mode with respect to the electronic device and at least one first target device. In some embodiments, the electronic device resumes an application that was in execution on the electronic device before the electronic device entered the target mode. Further, the electronic device may also resume the application in execution that was in execution on the target device before the target device entered the target mode. Alternatively, or in addition, the target device resumes the application that was in execution on the target device prior to entering the target mode.

When the electronic device determines to return to the same status as before entering the target mode, the electronic device may resume the paused application that was in execution before entering the target mode in operation 706. Also, the electronic device may transmit a target mode release notification to the target devices, and in response, the target devices may resume respectively paused application in execution before entering the target mode.

In some embodiments, in operation 707, if the electronic device determines to not return to the same status as before entering the target mode, the electronic device may set an application to be executed after releasing the target mode. In some embodiments, the electronic device sends a notification to the target devices to execute an application after releasing the target mode. For example, the electronic device may release the Work mode and may enter Entertainment mode that is the same mode as a mode before entering the Work mode. Before entering Entertainment mode again, the electronic device may receive a user input via selection of the second interface 533 to switch to Entertainment mode and the electronic device may display the screen 513 capable of changing a setting of Entertainment mode. The electronic device may change a setting of a target device/electronic device before entering the Work mode. For example, the user may desire not to resume an application that may be in execution on a target device associated with Entertainment mode and/or on the electronic device before switching to the Work mode. For example, upon receiving, from the user, an input to change a setting such that not application D but application Q may be executed when the first target device 504 enters Entertainment mode, the electronic device may transmit, to the target device 504, information in which the application to be executed in response to entering Entertainment mode is changed. Then, upon receiving a Work mode release notification and an Entertainment mode entry notification from the electronic device, the target device 504 may execute not the application D (which was paused before entering the Work mode), but the application Q.

Figure 8:
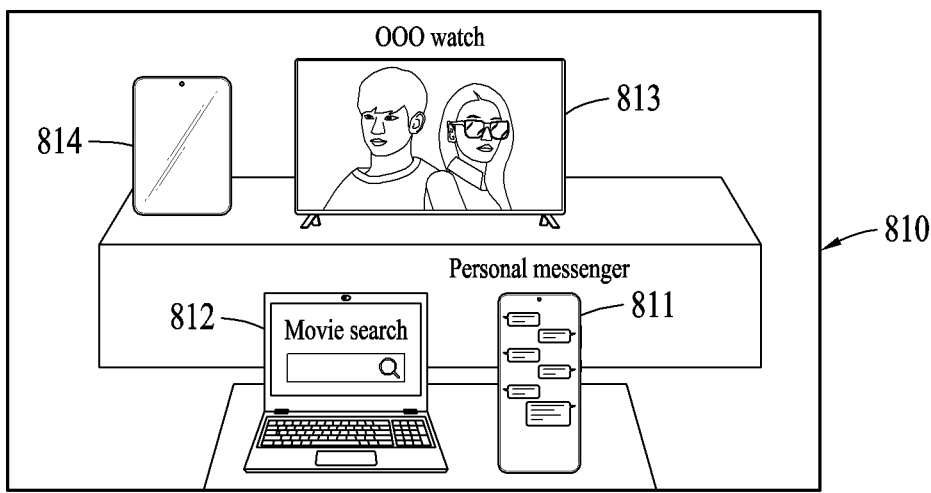
FIG. 8 illustrates an example of a case in which an electronic device enters a target mode according to an example embodiment.
Figure 8:
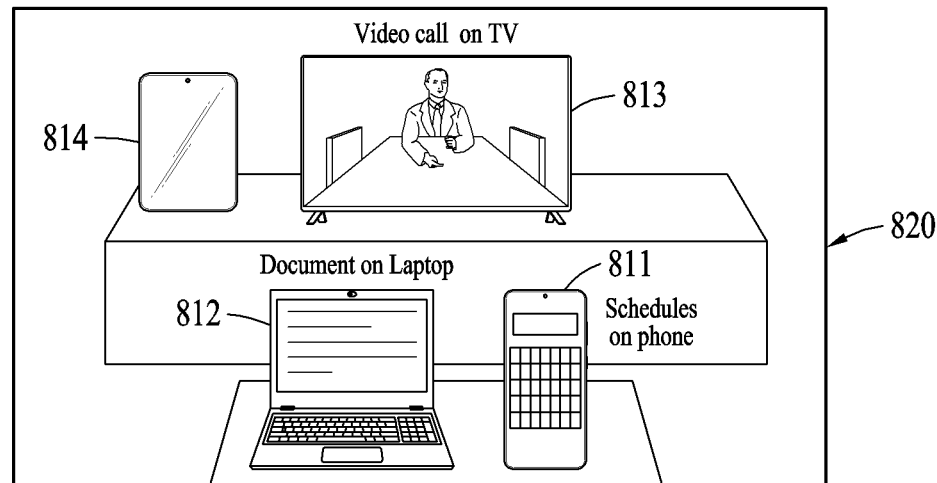
Figure 8:
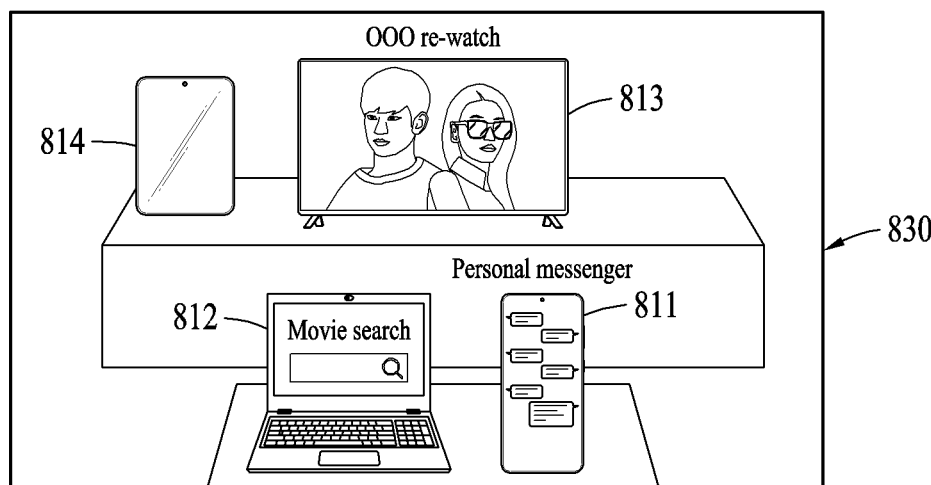

FIG. 8 illustrates an example of a case in which an electronic device enters a target mode according to an example embodiment.

A block 810 illustrates an example scenario that involves an electronic device 811 and target devices 812 (e.g., laptop) and 813 (e.g., TV) corresponding to a target mode. The block 810 depicts a scene before the devices have entered the target mode. Before entering the target mode, the electronic device 811 and the target devices 812 and 813 may independently operate with respect to each other. Another external electronic device 814 (e.g., tablet) is not selected as a target device for the target mode in the depicted scenario. It is understood that the types of devices depicted are exemplary, and that in one or more embodiments, different/more/fewer electronic devices may be involved.

A block 820 illustrates an example in which the electronic device 811 and the target devices 812 and 813 corresponding to the target mode operate in the target mode.

The electronic device 811 may enter the target mode by receiving an input from the user. The electronic device 811 may transmit a target mode entry notification to the target devices 812 and 813. In response, the electronic device 811 enters the target mode collectively with the target devices 812 and 813 selected for the target mode. In some embodiments, each of the electronic device 811, the target device 812, and the target device 813 may execute an application corresponding to the target mode. Here, each of the electronic device 811 and the first target devices 812 and 813 pauses an application that is in execution before entering the target mode. It should be noted that the device 814 continues to operate independently (because it is not one of the selected target device for the target mode).

A block 830 illustrates an example in which the electronic device 811 and the target devices 812 and 813 corresponding to the target mode release the target mode.

The electronic device 811 may release the target mode in response to receiving an input from the user. The electronic device 811 may transmit a target mode release notification to the target devices 812 and 813, and the electronic device 811, the target device 812, and the target device 813 collectively release the target mode. In this case, each of the electronic device 811 and the first target devices 812 and 813 may resume an application that was in execution before entering the target mode (and was paused when entering the target mode). In this example, the device 814 is unaffected throughout this transition into/out of the target mode.

Figure 9A:
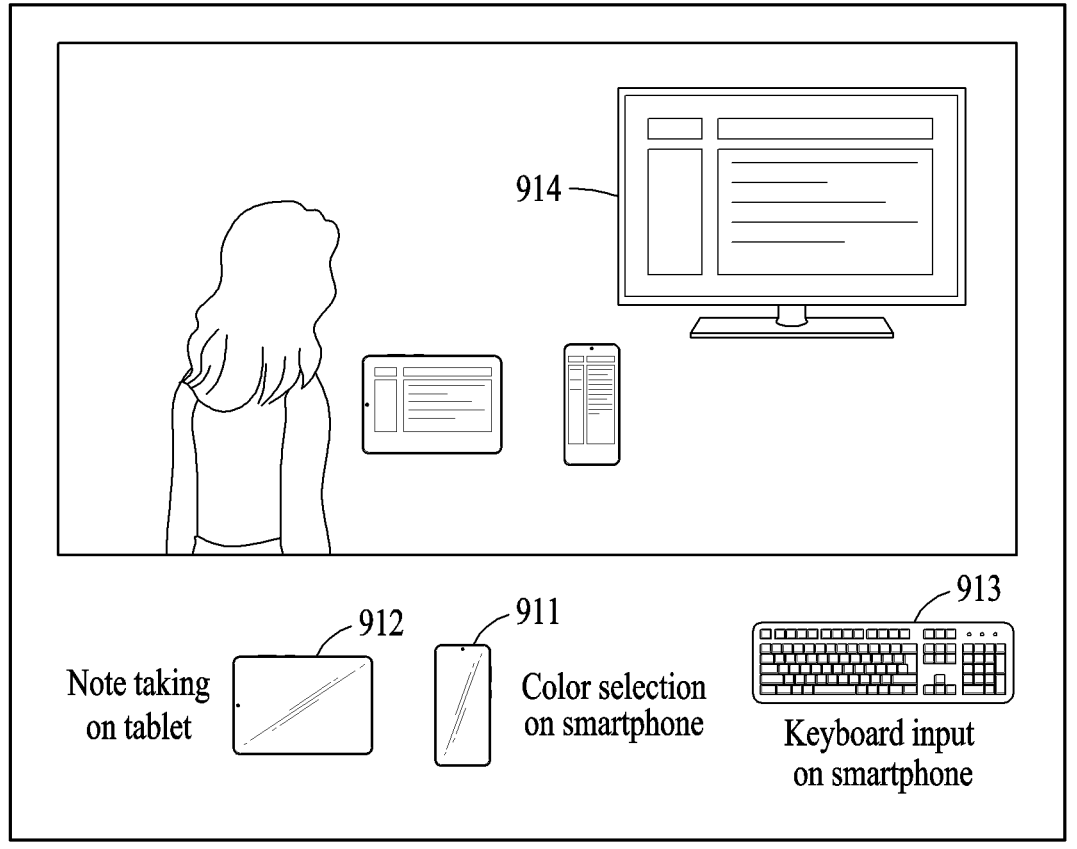
FIGS. 9A and 9B illustrate a process of interacting with target devices selected in response to a target mode when an electronic device enters the target mode according to an example embodiment.
Figure 9B:
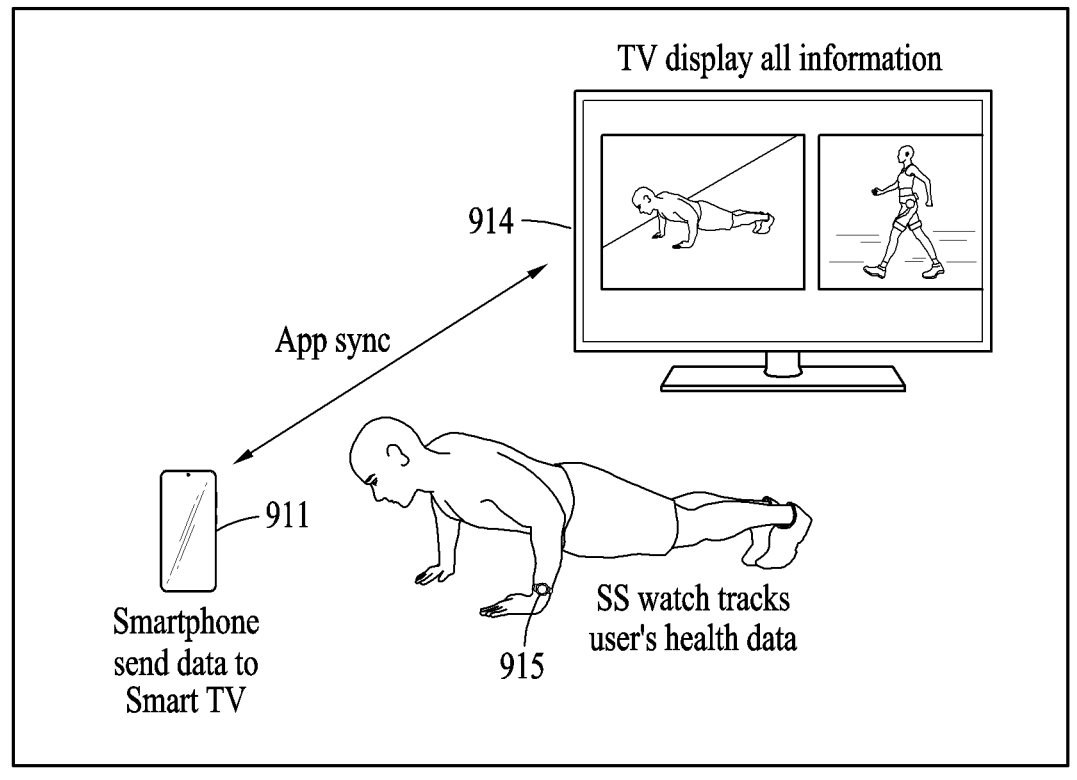

FIGS. 9A and 9B illustrate a process of interacting with target devices selected in for a target mode when an electronic device enters the target mode according to an example embodiment.

Upon entering the target mode, the electronic device may interact with at least one target device selected for the target mode. However, upon releasing the target mode, the electronic device may terminate interaction with the target devices. According to an example embodiment, the electronic device may select at least one second target device for a second mode different from the target mode. The second target device is selected from among the external devices of the same user as the user of the electronic device. In response to releasing the target mode and entering the second mode, the electronic device may terminate interaction with the target devices associated with the target mode, and may interact with the second target device associated with the second target mode.

Referring to FIG. 9A, when an electronic device 911 enters Work mode, the electronic device 911 may interact with a target device selected for the Work mode. For example, the target device selected in response to the Work mode may be a tablet 912, a mobile keyboard 913, and a TV 914. When the electronic device 911 enters the Work mode, the tablet 912, the mobile keyboard 913, and the TV 914 may collectively enter the Work mode along with the electronic device 911. The electronic device 911 may also interact with the tablet 912, the mobile keyboard 913, and the TV 914 when in the Work mode. For example, upon entering the Work mode, the electronic device 911 may actively communicate with target devices corresponding to the Work mode. For example, the electronic device 911 may transmit a control signal corresponding to a candidate color selected by the user to the tablet 912 and the tablet 912 may display the user's handwriting with the candidate color received from the electronic device 911. The electronic device 911 may receive an input from the user through the mobile keyboard 913. The electronic device 911 may mirror a screen of the electronic device 911 on the TV 914. In this manner, the electronic device 911 and the target devices, for example, the tablet 912, the mobile keyboard 913, and the TV 914, selected for the Work mode may interact with each other and may provide more efficient user experience through the interaction.

Referring to FIG. 9B, the electronic device 911 may release the target mode, Work mode and may enter the second mode, for example, Fitness mode. In the case of entering the Fitness mode, the electronic device 911 may terminate interaction with a target device corresponding to the Work mode and may newly interact with a target device corresponding to the Fitness mode. For example, in the case of entering the Fitness mode, the electronic device 911 may interact with the TV 914 and a smartwatch 915 that are target devices selected for the Fitness mode. For example, the electronic device 911 may transmit a video captured from the user doing exercise to the TV 914 and the TV 914 may display the video received from the electronic device 911. Also, the smartwatch 915 may measure health data of the user during exercise and may transmit the measured health data to the TV 914, and the TV 914 may display the health data received from the smartwatch 915. Upon entering the Fitness mode, the TV 914 may display an exercise video frequently viewed by the user on the display.

Figure 10:
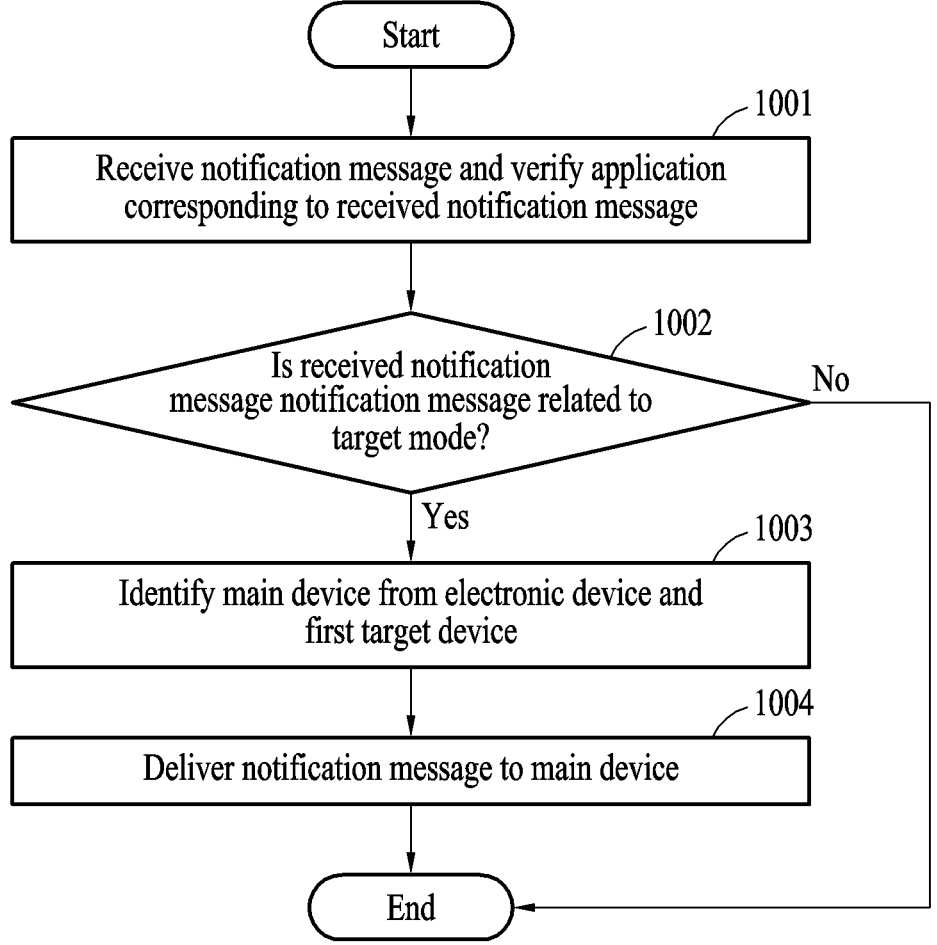
FIG. 10 is a flowchart illustrating a process of providing, by an electronic device, a notification for a notification message to a user according to an example embodiment.

FIG. 10 is a flowchart 1000 illustrating a process of providing, by an electronic device, a notification for a notification message to a user according to an example embodiment.

In operation 1001, an electronic device, according to an example embodiment, may receive a notification message while operating in a target mode and may verify an application corresponding to the received notification message. The electronic device may verify an application through which the notification message is delivered.

In operation 1002, the electronic device may determine whether the received notification message is a notification message related to the target mode. According to an example embodiment, the electronic device may determine whether the received notification message is the notification message related to the target mode, based on historic information about the notification message and settings of the user.

For example, the historic information on the notification message may include information on a notification message the user has verified so far. For example, the electronic device may verify whether the currently received notification message is the notification message related to the target mode based on information on the notification message verified by the user while the electronic device is operating in a previous target mode. The electronic device may calculate a similarity between notification messages verified by the user while the electronic device is operating in the target mode and the received notification message. When the calculated similarity exceeds a threshold similarity, the electronic device may determine the received notification message as the notification message related to the target mode.

According to an example embodiment, the electronic device may determine whether the notification message is the notification message related to the target mode based on settings by the user. For example, in the case of entering the target mode according to the settings by the user, the electronic device may be set to provide a notification for a notification message related to a child. The electronic device may determine the notification message related to the child as the notification message related to the target mode.

Further, when the received notification message is determined as a notification message unrelated to the target mode, the electronic device may not provide the notification for the received notification message to the user. In this case, the electronic device may provide the notification for the received notification message to the user after releasing the target mode. The notification may include, for example, sound, vibration, screen ON, flickering of light emitting diode (LED), or any other type of notification.

In operation 1003, the electronic device may identify a primary device from the electronic device and the target devices corresponding to the target mode. Here, the primary device may represent a device that the user primarily uses or gazes at in the target mode. The primary device may be changed according to an action of the user over time. For example, when the user mainly views a TV among external devices, the TV may be deemed as the primary device. When the user stops viewing the TV and uses a tablet to view the content instead, the tablet may be deemed the primary device. A method of identifying the primary device is further described with reference to FIG. 11.

In operation 1004, when the received notification message is determined as the notification message related to the target mode, the electronic device may transmit the received notification message to the primary device. The primary device may display the received notification message on a display of the primary device. The electronic device may transmit the notification message to the primary device, and the primary device may display the received notification message on the display of the primary device to assist the user to verify the notification message more quickly and conveniently.

Figure 11:
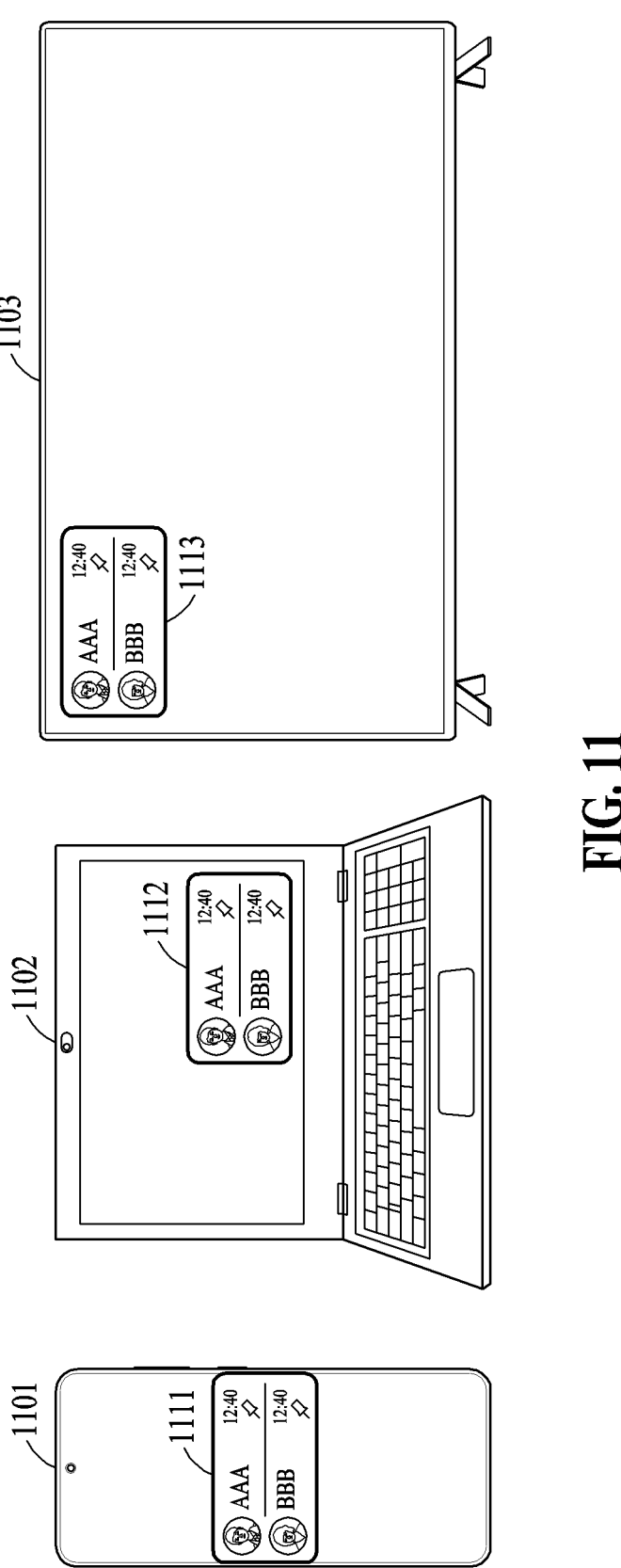
FIG. 11 illustrates a process of identifying, by an electronic device, a primary device and transmitting a notification message to the identified main device according to an example embodiment.

FIG. 11 illustrates a process of identifying, by an electronic device, a primary device and transmitting a notification message to the identified primary device according to an example embodiment.

According to an example embodiment, a primary device may be determined based on at least one of log information for each device, activity information, and operation information of a sensor included in the electronic device and the one or more target devices selected for a target mode. Referring to FIG. 11, when an electronic device 1101 is determined as a primary device, the electronic device 1101 may display a notification message 1111 on a display of the electronic device 1101. As another example, when a laptop 1102 among target devices corresponding to the target mode is determined as the primary device, the electronic device 1101 may transmit a received notification message to the laptop 1102 and the laptop 1102 may display a notification message 1112. As another example, when a TV 1103 among the target devices corresponding to the target mode is determined as the primary device, the electronic device 1101 may transmit a received notification message to the TV 1103 and the TV 1103 may display a notification message 1113.

According to an example embodiment, the primary device may be determined by a server (e.g., the server 330 of FIG. 3). Each of the electronic device 1101 and the one or more target devices, for example, the laptop 1102 and the TV 1103, selected for the target mode may establish a communication with the server. Here, the server may determine the primary device based on at least one of log information for each device, activity information, and operation information of a sensor included in a device. For example, the server may determine whether a corresponding device is in a turned-on state or in a turned-off state using the log information on the device and may determine a level of activity of the device using the activity information on the device. As another example, the server may determine whether the sensor is identifying the user based on operation information of the sensor included in the device. For example, the server may extract the primary device by inputting the log information for each device, the activity information, and the operation information of the sensor included in the device to a pre-trained machine learning model.

That is, the server may determine the primary device based on at least one of log information for each device, activity information, and operation information of a sensor included in a device among the electronic device 1101 and the one or more target devices (for example, the laptop 1102 and the TV 1103) corresponding to the target mode. Here, a number of primary devices may be one or more. The server may transmit information on the identified primary device to the electronic device 1101 and the electronic device 1101 may identify the primary device based on information on the primary device received from the server.

Further, an accessory device (e.g., a wireless earphone) may be linked with the primary device. For example, when the electronic device 1101 is determined as the primary device, the accessory device may be linked with the electronic device 1101. Subsequently, when the primary device role is changed to be the TV 1103, the accessory device may terminate interaction with the electronic device 1101 and may newly interact with the TV 1103.

Figure 12:
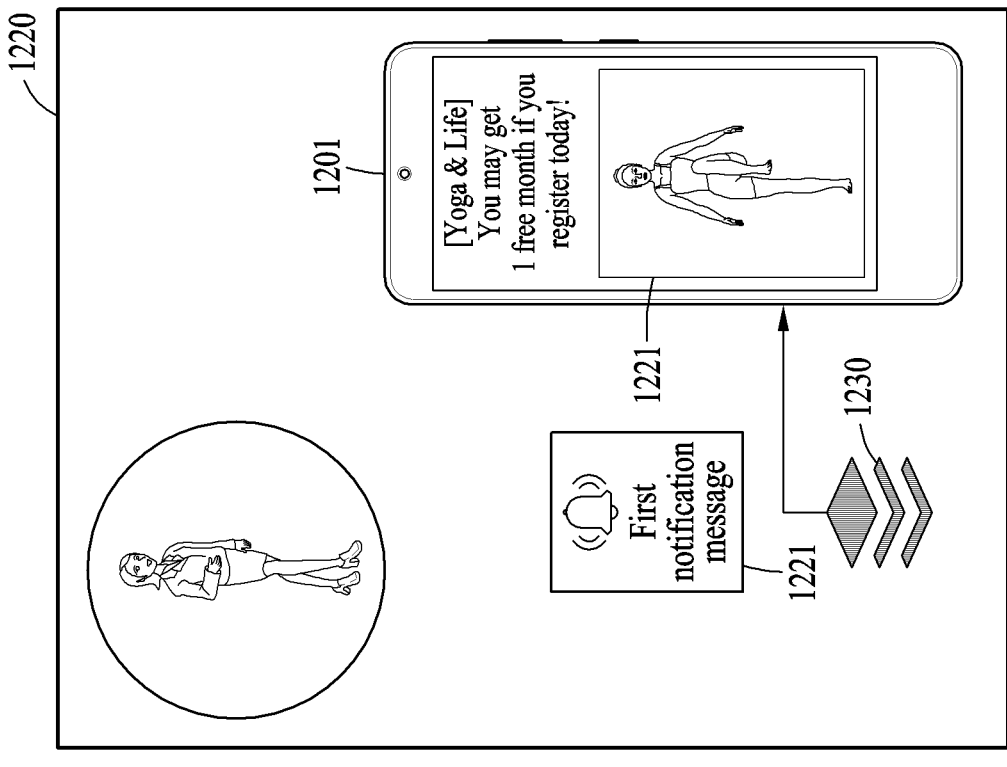
FIG. 12 illustrates a process of providing, by an electronic device, a notification for a notification message according to an example embodiment.
Figure 12:
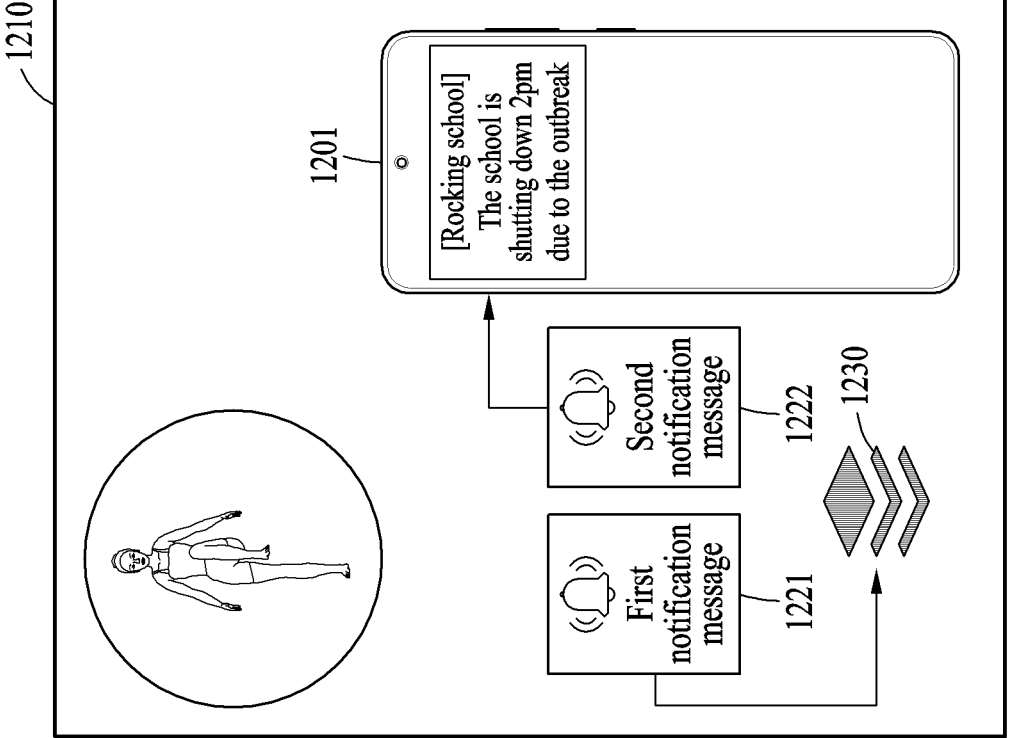

FIG. 12 illustrates a process of providing, by an electronic device, a notification for one or more notifications received according to an example embodiment.

An electronic device according to an example embodiment may release a target mode and then provide a notification indicative of other notification messages that were received and suppressed while operating in the target mode.

A block 1210 illustrates an example in which an electronic device 1201 enters and operates in a target mode. The electronic device 1201 may receive a first notification message 1221 and a second notification message 1222 while operating in the target mode. The first notification message 1221 may be a notification message unrelated to the target mode and the second notification message 1222 may be a notification message related to the target mode. The electronic device 1201 may provide a notification to a user by displaying the second notification message 1222, which is determined to be related to the target mode. In some embodiments, the notification is displayed on the primary device among the electronic devices collectively operating in the target mode, e.g., electronic device 1201 in FIG. 12. In contrast, the first notification message 1221, which is unrelated to the target mode is suppressed, i.e., the electronic device 1201 does not provide a notification to the user. The electronic device 1201 stores the first notification message 1221 in a memory 1230, in some embodiments.

A block 1220 illustrates an example in which the electronic device 1201 is operating after releasing the target mode. After releasing the target mode, the electronic device 1201 provides a notification for the first notification message 1221, which was suppressed (see 1210). In response to releasing the target mode, the electronic device 1201 extracts the first notification message 1221, which was deemed unrelated to the target mode, and consequently stored in the memory 1230. The electronic device 1201 now provides a notification to the user by displaying the first notification message 1221.

FIG. 13 is an example table showing information on a candidate device corresponding to a target mode and a candidate application to be executed in response to entering the target mode, received by an electronic device from a server according to an example embodiment.

According to an example embodiment, the electronic device may receive, from the server (e.g., the server 330 of FIG. 3), information on at least one candidate device that may be selected as a target device for the target mode. In some embodiments, the server 330 identifies and suggests the candidate device based on a type of occupation mapped to a user account connected to the server. The server 330 also identifies and suggests one or more candidate applications for the one or more candidate devices based on the user account.

Referring to FIG. 13, the server may store a table in which a candidate device corresponding to a target mode and a corresponding candidate application(s) for each candidate device are stored. The server may additionally store a table corresponding to another mode aside from the target mode. The electronic device may access the server with a user account for a user of the electronic device and the server may identify a type of occupation mapped to the user account connected by the electronic device. For example, when the server identifies a type of occupation mapped to the user account as a "designer," the server may extract information on a candidate device corresponding to the "designer" from the table 1300 and transmit the same to the electronic device. The server may further extract information on a corresponding candidate application for each candidate device and transmit the same to the electronic device.

According to an example embodiment, the electronic device may select a candidate device received from the server as a target device corresponding to a target mode. The electronic device may further select a corresponding candidate application for each candidate device as an application to be executed in response to entering the target mode. The candidate application may be selected to be executed by the electronic device, the candidate (target) device, or both.

A method performed by an electronic device (e.g., the electronic device 101 of FIG. 1 or the electronic device 310 of FIG. 3) according to an example embodiment may include setting an application to be executed when a corresponding device enters a target mode. The electronic device may select one or more applications for each of at least one target devices (e.g., at least one first target device 321, 322, 323, 324 of FIG. 3) selected for the target mode. In response to entering the target mode, the selected one or more applications corresponding to the target mode are executed by the electronic device and/or selected target devices, respectively. The electronic device further transmits, to the one or more target devices, a target mode entry notification that triggers executing the selected applications corresponding to the target mode on the one or more target devices. In response to releasing the target mode, the electronic device can cause resuming an application that was in execution before entering the target mode, and which was paused when the target mode was entered. Further, the electronic device transmits, to the one or more target devices, a target mode release notification that triggers resuming the application that was in execution before entering the target mode.

The executing of the application corresponding to the target mode may include pausing the application in execution before entering the target mode.

The setting of the application to be executed may include setting one or more applications to be executed when the corresponding device enters the target mode and setting execution priority of the one or more applications.

The method performed by the electronic device according to an example embodiment may further include displaying, on a display of the electronic device, a screen that includes a plurality of interfaces corresponding to a plurality of modes that the electronic device can enter. In response to receiving a user input via selection of/interaction with an interface corresponding to the target mode, the target mode is entered. In response to receiving a user input via selection of/interaction with an interface corresponding to a first mode different from the target mode, the target mode is released and the first mode is entered.

The method performed by the electronic device according to an example embodiment may further include setting a schedule of the target mode related to a scheduled entry point in time at which entry into the target mode is scheduled. The schedule further specifies a scheduled release point in time at which release of the target mode is scheduled. In response to occurrence of the scheduled entry point in time, a mode entry message corresponding to the target mode is generated and displayed on a display of the electronic device. In response to receiving a user input for selecting the mode entry message corresponding to the target mode of the electronic device, entering the target mode. In response to occurrence of the scheduled release point in time, a mode release message corresponding to the target mode is generated and displayed. Further, in response to receiving a user input via selection of the mode release message corresponding to the target mode from the user, the target mode is released.

The method performed by the electronic device according to an example embodiment may further include selecting at least one second target device corresponding to a second mode. The second target device is selected from the external devices. It should be noted that the second mode can be different from the target mode. In response, the electronic device releases the target mode and enters the second mode. In some embodiments, the electronic device terminates interaction with the one or more target devices and instead is enabled to perform interaction with one or more second target devices.

The method performed by the electronic device according to an example embodiment may further include, in response to receiving a notification message, determining whether the received notification message is a notification message related to the target mode. In response to the received notification message being determined to be related to the target mode, transmitting the received notification message to the primary device that is determined from the target devices.

The primary device may be determined based on at least one of log information for each device, activity information, and operation information of a sensor included in a device among the electronic device and the target devices.

The method performed by the electronic device according to an example embodiment may further include providing a notification for notification messages that were suppressed because such notification messages were deemed not to be related to the target mode and were received while operating in the target mode. The notification about such suppressed messages is provided after releasing the target mode.

The selection of the one or more target devices and/or the application to be executed upon entering the target mode may be set based on suggestions of one or more candidate applications received from the server. The selection of the target devices includes receiving, from the server, information on at least one candidate device for the target mode based on a type of occupation mapped to a user account of the electronic device. Other demographic information apart from occupation may also be used, such as age, location, likes, dislikes, etc. Based on the user account of the electronic device connected to the server, the server can also suggest one or more candidate applications for each of the at least one candidate device for the target mode.

An electronic device according to an example embodiment may include a processor configured to set an application to be executed when a device from a set of target devices enters target mode. The set of target devices is selected specifically for the target mode from among several external devices associated with the same user as a user of the electronic device. The electronic device enters the target mode collectively with the set of target devices. The electronic device executes an application corresponding to the target mode. The electronic device transmits, to the selected set of target devices, a target mode entry notification of the electronic device that triggers the target devices to enter into target mode, which includes an operation of executing the application corresponding to the target mode. The electronic device and/or the target devices may pause an ongoing execution of another application prior to entering the target mode. Subsequently, in response to releasing the target mode, the paused application can be resumed in the electronic device and/or the target devices. The electronic device transmits, to the target devices, a target mode release notification of the electronic device that triggers an operation of resuming the application.

The processor may pause the application in execution before entering the target mode.

The processor may set the application to be executed when the corresponding device enters the target mode. The processor may set execution priority of each of the applications that are selected for execution.

The processor may display, on a display of the electronic device, a screen that includes a plurality of interfaces corresponding to a plurality of modes that the electronic device can enter. That is the plurality of modes provide possible target modes. In response to receiving a user input via selection of an interface corresponding to a mode, the electronic device uses that mode as the target mode. Further, in response to receiving the user input of a first mode different from a present mode in which the electronic device is operating, the electronic device releases the present mode and enters the first mode as the new target mode.

The processor may set a schedule for the target mode. The schedule specifies a scheduled entry point in time at which the target mode is entered. The schedule may also specify a scheduled release point in time at which the target mode is released. In some embodiments, at the scheduled entry point in time, a mode entry message corresponding to the target mode is generated and displayed. For example, the message is provided on a display of the electronic device as a prompt for the user. In response to receiving a user input for selecting the target mode from the mode entry message, the electronic device enters the target mode. Further, at the scheduled release point in time, a mode release message is generated and displayed. In response to receiving a user input for selecting the release from the target mode, the electronic device releases the target mode.

The processor may select at least one second target device corresponding to a second mode different from the target mode from among the external devices, and in response to the electronic device releasing the target mode and entering the second mode, the electronic device terminates interaction with the target device associated with the target mode and initiates interaction with the at least one second target device.

The processor may, in response to receiving a notification message, determine whether the received notification message is related to the target mode. In response to the received notification message being related to the target mode, the received notification message is transmitted to a primary device. The primary device is selected from among the electronic device and the set of target devices.

The primary device may be determined based on at least one of log information for each device, activity information, and operation information of a sensor included in a device.

The processor may suppress the notification message if it is deemed not to be related to the target mode. Subsequently, the processor may provide a notification for such suppressed notification messages that were excluded while operating in the target mode. The notification for the suppressed notifications can be provided after releasing the target mode.

The processor may receive, from a server, information on at least one candidate device which may be selected as a target device for the target mode. The server may suggest the candidate devices based on demographic information of the user that is extracted from a user account of the user of the electronic device. For example, the candidate devices may be suggested based on a type of occupation of the user as provided in the user account. The user account may be used to connect the electronic device to the server. Further, the server may also suggest one or more candidate application for each of the candidate devices. The user can select, from the one or more candidate applications, a set of applications to be executed upon entering the target mode.

What is claimed is:

1. A method performed by an electronic device, the method comprising:
   setting a first application to be executed by a first target device corresponding to a target mode, wherein the target mode is one of a plurality of modes available to the electronic device, wherein the first target device is selected from among a plurality of external devices associated with the same user as a user of the electronic device;
   determining that the electronic device enters the target mode;

in response to the electronic device entering the target mode, executing a second application;
   transmitting, to the first target device, a target mode entry notification of the electronic device that triggers an operation of executing the first application on the first target device;
   determining that the electronic device is to release the target mode;
   in response to the electronic device releasing the target mode, resuming a third application that was in execution on the electronic device before entering the target mode; and
   transmitting, to the first target device, a target mode release notification of the electronic device that triggers an operation of resuming a fourth application that was in execution on the first target device before entering the target mode.

2. The method of claim 1, wherein the executing of the first application corresponding to the target mode by the first target device comprises pausing the fourth application that was in execution before entering the target mode.

3. The method of claim 1, wherein the setting of the first application to be executed comprises setting a plurality of first applications to be executed when the first target device enters the target mode and setting execution priority of each of the first applications.

4. The method of claim 1, further comprising:
   displaying, on a display of the electronic device, a screen that includes a plurality of interfaces respectively corresponding to the plurality of modes available to the electronic device;
   in response to receiving a user input selecting an interface corresponding to the target mode, entering the target mode; and
   in response to receiving a user input, selecting an interface corresponding to a first mode different from the target mode, releasing the target mode and entering the first mode.

5. The method of claim 1, further comprising:
   setting a schedule of the target mode, the schedule comprising a scheduled entry point in time at which entry into the target mode is scheduled and a scheduled release point in time at which release of the target mode is scheduled;
   at the scheduled entry point in time, generating and displaying a mode entry message corresponding to the target mode and, in response to receiving a user input selecting the mode entry, entering the target mode; and
   at the scheduled release point in time, generating and displaying a mode release message corresponding to the target mode and, in response to receiving a user input selecting the mode release, releasing the target mode.

6. The method of claim 1, further comprising:
   selecting, from among the external devices, a second target device corresponding to a second mode different from the target mode; and
   in response to the electronic device releasing the target mode and entering the second mode, terminating interaction with the first target device and performing interaction with the second target device.

7. The method of claim 1, further comprising:
   in response to receiving a notification message, determining that the notification message is related to the target mode; and
   in response to the notification message being related to the target mode, transmitting the notification message to a primary device selected from among the electronic device and the first set-of-target devices.

8. The method of claim 7, wherein the primary device is determined based on at least one of log information, activity information, and operation information of a sensor included in the electronic device and the first target devices.

9. The method of claim 7, further comprising:

providing, after releasing the target mode, a notification for one or more suppressed notification messages that were not related to the target mode and received while operating in the target mode.

10. The method of claim 1, wherein the setting of the first application to be executed comprises receiving, from a server, information on at least one candidate device for the target mode based on a type of occupation mapped to a user account of the electronic device connected to the server, and receiving from the server a candidate application for each of the at least one candidate device.

11. An electronic device comprising:

a processor configured to:

set a first application to be executed by a first target device corresponding to a target mode, wherein the target mode is one of a plurality of modes available to the electronic device, wherein the first target device is selected from among a plurality of external devices associated with the same user as a user of the electronic device;

determining that the electronic device enters the target mode;

in response to the electronic device entering the target mode, execute a second application;

transmit, to the first target device, a target mode entry notification of the electronic device that triggers an operation of executing the first application on the first target device;

determining that the electronic device is to release the target mode;

in response to the electronic device releasing the target mode, resume a third application that was in execution on the electronic device before entering the target mode; and transmit, to the first target device, a target mode release notification of the electronic device that triggers an operation of resuming a fourth application that was in execution on the first target device before entering the target mode.

12. The electronic device of claim 11, wherein the processor is configured to pause the fourth application's execution before entering the target mode.

13. The electronic device of claim 11, wherein the first application comprises a plurality of applications, and the processor is configured to set execution priority of each of the applications.

14. The electronic device of claim 11, wherein the processor is configured to display, on a display of the electronic device, a screen that includes a plurality of interfaces respectively corresponding to the plurality of modes of the electronic device, in response to receiving a user input for selecting an interface corresponding to the target mode, enter the target mode, and in response to receiving a user input for selecting an interface corresponding to a first mode different from the target mode, release the target mode and enter the first mode.

15. The electronic device of claim 11, wherein the processor is configured to:

set a schedule of the target mode, the schedule comprising a scheduled entry point in time at which entry into the target mode is scheduled and a scheduled release point in time at which release of the target mode is scheduled;

at the scheduled entry point in time, generate and display a mode entry message corresponding to the target mode and, in response to receiving a user input selecting the mode entry, entering the target mode; and at the scheduled release point in time, generate and display a mode release message corresponding to the target mode and, in response to receiving a user input selecting the mode release, releasing the target mode.

16. The electronic device of claim 11, wherein the processor is configured to select, from among the external devices, a second target device corresponding to a second mode different from the target mode, and in response to the electronic device releasing the target mode and entering the second mode, terminating interaction with the first target device and performing interaction with the second target device.

17. The electronic device of claim 11, wherein the processor is configured to, in response to receiving a notification message, determine that the notification message is related to the target mode, and in response to the notification message being related to the target mode, transmit the notification message to a primary device selected from among the electronic device and the first set of target devices.

18. The electronic device of claim 17, wherein the primary device is determined based on at least one of log information, activity information, and operation information of a sensor included in the electronic device and the first target devices.

19. The electronic device of claim 17, wherein the processor is configured to provide, after releasing the target mode, a notification for one or more suppressed notification messages that were not related to the target mode and received while operating in the target mode.

20. The electronic device of claim 11, wherein the processor is configured to receive, from a server, information on at least one candidate device for the target mode based on a type of occupation mapped to a user account of the electronic device connected to the server, and receiving from the server a candidate application for each of the at least one candidate device.

* * * * *